US006618518B1

(12) United States Patent
Mahadevan et al.

(10) Patent No.: US 6,618,518 B1
(45) Date of Patent: Sep. 9, 2003

(54) MICROELECTROMECHANICAL OPTICAL CROSS-CONNECT SWITCHES INCLUDING ROW AND COLUMN ADDRESSING AND METHODS OF OPERATING SAME

(75) Inventors: Ramaswamy Mahadevan, Chapel Hill, NC (US); Vivek Agrawal, Durham, NC (US)

(73) Assignee: JDS Uniphase Corporation, San Jose, CA (US)

( * ) Notice: Subject to any disclaimer, the term of this patent is extended or adjusted under 35 U.S.C. 154(b) by 0 days.

(21) Appl. No.: 09/721,415

(22) Filed: Nov. 22, 2000

(51) Int. Cl.[7] .................................................. G02B 6/26

(52) U.S. Cl. ......................................... 385/18; 385/119

(58) Field of Search ............................... 385/17–19, 31, 385/119, 49, 52, 74, 88, 92

(56) References Cited

U.S. PATENT DOCUMENTS

| | | | | |
|---|---|---|---|---|
| 5,446,572 A | | 8/1995 | Husbands et al. | 359/133 |
| 5,771,321 A | * | 6/1998 | Stern | 385/31 |
| 5,796,884 A | | 8/1998 | Wingo | 385/16 |
| 5,841,917 A | | 11/1998 | Jungerman et al. | 385/17 |
| 5,982,554 A | | 11/1999 | Goldstein et al. | 359/629 |

OTHER PUBLICATIONS

Yi et al., *Magnetic Actuation of Hinged Microstructures*, IEEE Journal of Microelectromechanical Systems, vol. 8, No. 1, Mar. 1999, pp. 10–17.

Yi et al., *Parallel Assembly of Hinged Microstructures Using Magnetic Actuation*, Solid–State Sensor and Actuator Workshop, Hilton Head Island, South Carolina, Jun. 8–11, 1998, pp. 269–272.

Behin et al., *Magnetically Actuated Micromirrors for Fiber–Optic Switching*, Solid–State Sensor and Actuator Workshop, Hilton Head Island, South Carolina, Jun. 8–11, 1998, pp. 273–276.

Cowan et al., *Modeling of Stress–Induced Curvature in Surface–Micromachined Devices*, Paper #3225–06, SPIE Proceedings, V. 3225, 1997.

(List continued on next page.)

*Primary Examiner*—Khiem Nguyen
(74) *Attorney, Agent, or Firm*—Myers Bigel Sibley & Sajovec

(57) ABSTRACT

Optical cross-connect switches include input optical paths, output optical paths, and an array of electromechanical optical switches such as movable reflectors that are arranged in rows of the electromechanical optical switches and columns of the electromechanical optical switches, and that selectively move to couple the input optical paths to the output optical paths. Row address lines also are provided, a respective one of which is electromagnetically (i.e. electrically and/or optically) coupled to a respective row of the electromechanical optical switches. Column address lines also are provided, a respective one of which is electromagnetically coupled to a respective column of the electromechanical optical switches. If there are $n^2$ electromechanical optical switches that couple n optical paths to n optical output paths, less than $n^2$ row and column address lines may be provided. Preferably, 2n row and column address lines may be provided. The electromechanical optical switches may be configured upon selection of the respective row address line and column address line, but not selected upon selection of neither or only one of the respective row address line and column address line. Alternatively, the electromechanical optical switches may be configured to be selected except for an electromechanical optical switch that is electromagnetically coupled to the respective row address line and column address line.

38 Claims, 21 Drawing Sheets

OTHER PUBLICATIONS

Marxer et al., *Vertical Mirrors Fabricated by Reactive Ion Etching for Fiber Optical Switching Applications,* Proceedings of IEEE 10th Annual Internat. Workshop on Micro Electro Mechanical Systems, MEMS '97, Nagoya, Japan, pp. 49–54, 1997.

Judy et al., *Magnetically Actuated, Addressable Microstructures,* Journal of Microelectromechanical Systems, vol. 6, No. 3, Sep. 1997, pp. 249–255.

Smith, *Modern Optical Engineering,* McGraw–Hill, 1996, p. 176.

Toshiyoshi et al., *Optical Crossconnection by Silicon Micromachined Torsion Mirrors,* Digest IEEE/LEOS 1996 Summer Topical Meetings, 1996, pp. 63–64.

Judy et al., *Magnetic Microactuation of Torsional Polysilicon Structures,* Sensors and Actuators A vol. 53, 1996, pp. 392–397.

Field et al., *Micromachined 1×2 Optical Fiber Switch,* The 8th International Conference on Solid–State Sensors and Actuators, and Eurosensors IX, Stockholm, Sweden, Jun. 25–29, 1995, pp. 344–347.

\* cited by examiner

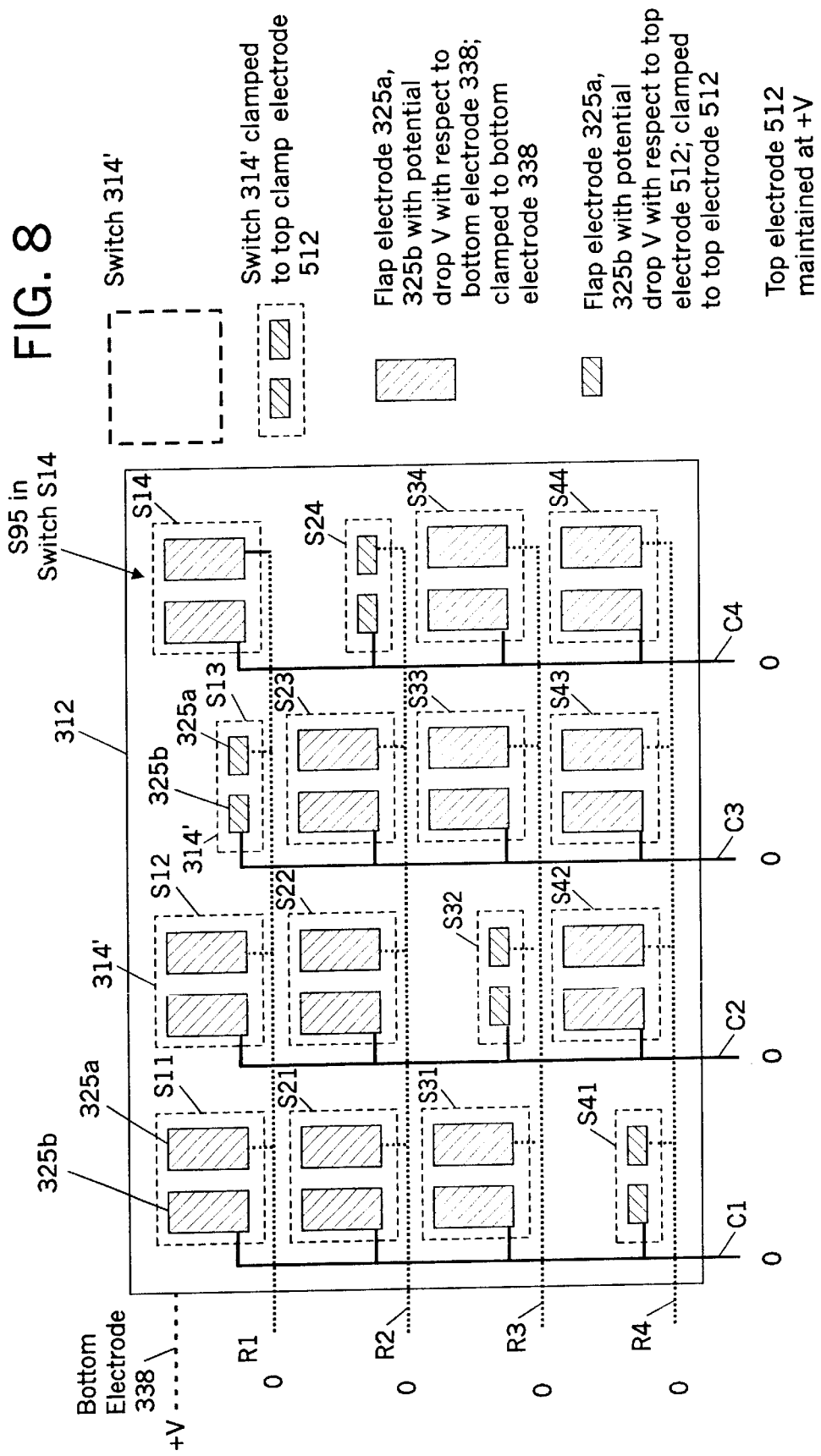

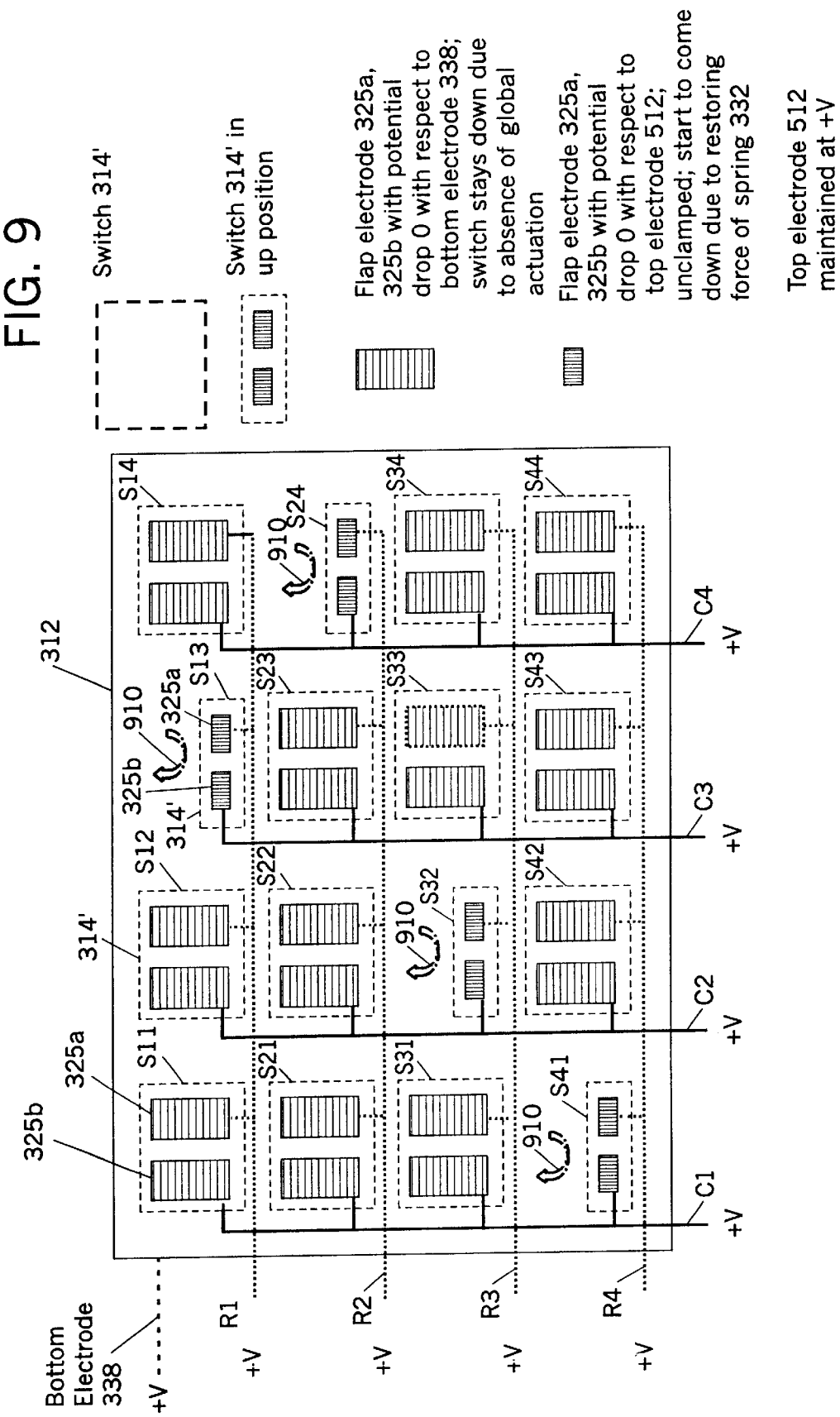

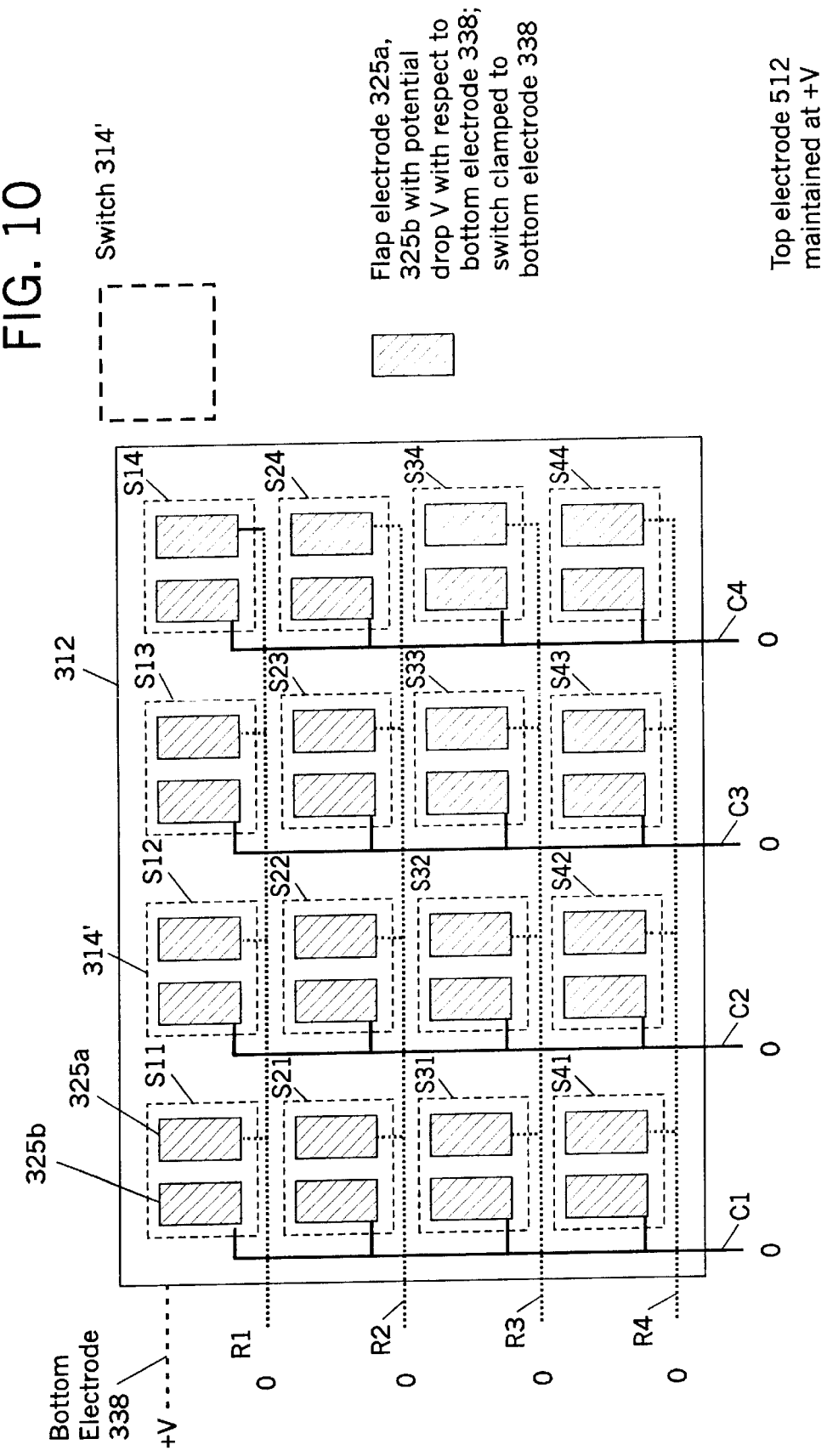

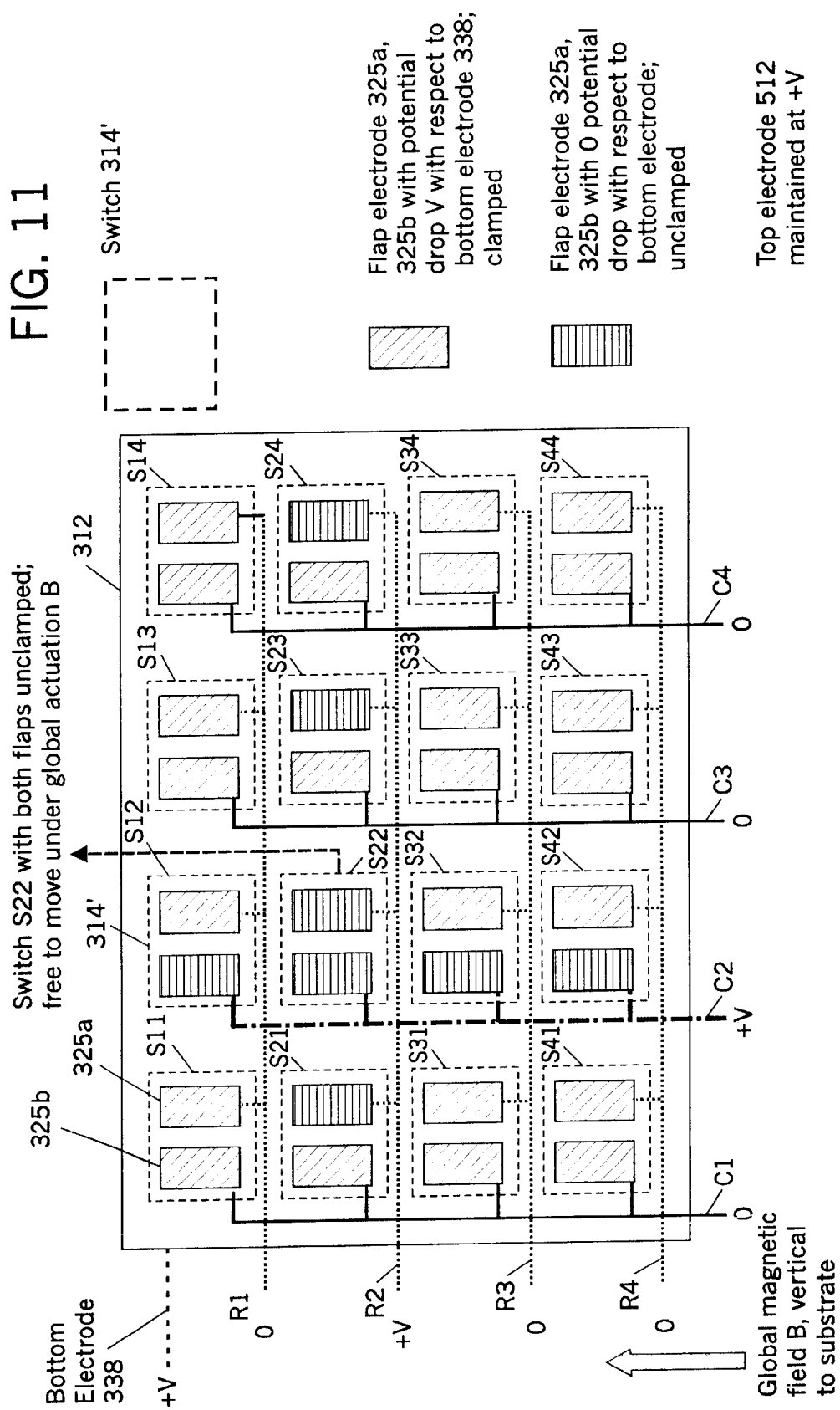

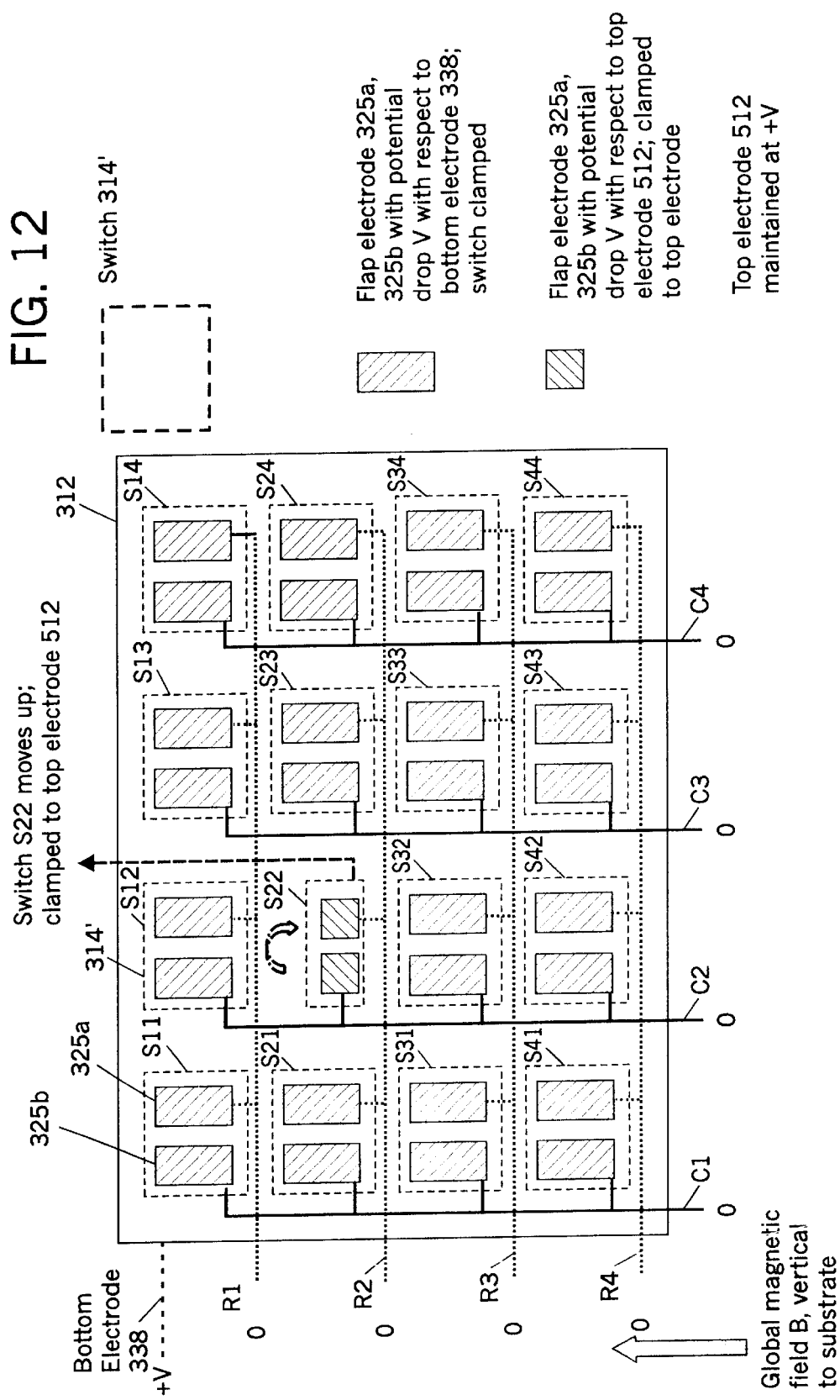

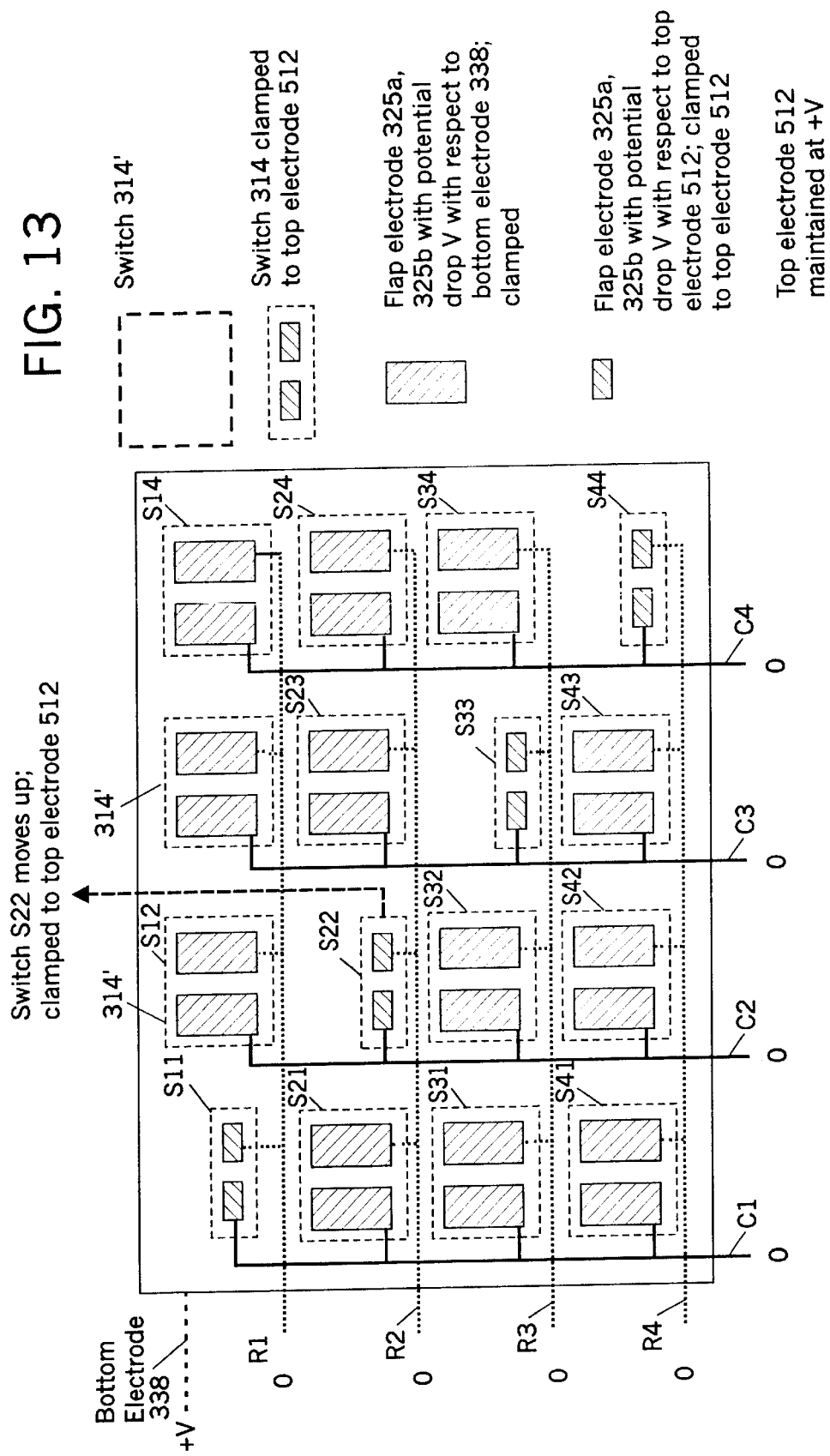

MICROELECTROMECHANICAL OPTICAL CROSS-CONNECT SWITCHES INCLUDING ROW AND COLUMN ADDRESSING AND METHODS OF OPERATING SAME

FIELD OF THE INVENTION

This invention relates generally to microelectromechanical system (MEMS) devices and operating methods therefor, and more particularly to MEMS optical cross-connect (OXC) switches and methods of operating same.

BACKGROUND OF THE INVENTION

Microelectromechanical systems (MEMS) recently have been developed as alternatives for conventional electromechanical devices, such as relays, actuators, valves and sensors. MEMS devices are potentially low-cost devices, due to the use of simplified microelectronic fabrication techniques. New functionality also may be provided because MEMS devices can be physically much smaller than conventional electromechanical devices.

MEMS technology has been used to fabricate optical cross-connect (OXC) switches that include a plurality of input optical paths, a plurality of output optical paths, and an array of electromechanical optical switches, such as movable reflectors, that selectively move to couple the plurality of input optical paths to the plurality of output optical paths. In particular, MEMS optical cross-connect switches can include an array of n rows and m columns of reflectors on a substrate such as a microelectronic substrate, to reflect optical energy from any of m input optical paths to any of n output optical paths. The selected reflector can be located in the array where the column associated with the m inputs and the row associated with the n outputs intersect. The selected reflector can be placed in a reflecting position to reflect the optical energy from the input to the selected output. The other reflectors can be placed in a non-reflecting position, so as not to impede the propagation of the optical energy from the input to the selected reflector and to the output.

Some conventional MEMS OXC switches operate by orienting the reflectors of the array using magnetic fields. In particular, the reflectors therein may be oriented horizontally (in the plane of the substrate on which the reflectors are located) in a non-reflecting position, and vertically (orthogonal to the substrate) in a reflecting position. Therefore, to switch optical energy from an input of the OXC switch to an output thereof, the selected reflector can be oriented vertically, and other blocking reflectors can be oriented horizontally. Magnetically actuated MEMS OXC switches are described, for example, in U.S. patent application Ser. No. 09/489,264, filed Jan. 21, 2000 (now U.S. Pat. No. 6,396,975), entitled *MEMS Optical Cross-Connect Switch*, to Wood et al., and assigned to the assignee of the present invention, the disclosure of which is hereby incorporated herein by reference in its entirety, and U.S. patent application Ser. No. 09/487,976, filed Jan. 20, 2000 (now U.S. Pat. N0. 6,366,186), entitled *MEMS Magnetically Actuated Switches and Associated Switching Arrays* to Hill et al., assigned to the assignee of the present invention, the disclosure of which is hereby incorporated herein by reference in its entirety.

Magnetically actuated optical cross-connect switches also are disclosed in three publications by members of the Berkeley Sensor and Actuator Center (BSAC) of the University of California, Berkeley. In particular, in a publication entitled *Magnetic Microactuation of Torsional Polysilicon Structures* to Judy et al., Sensors and Actuators A, Vol. 53, 1996, pp. 392–397, a microactuator technology utilizing magnetic thin films and polysilicon flexures is applied to torsional microstructures. These structures are constructed in a batch-fabrication process that combines electroplating with conventional IC-lithography, materials, and equipment. A microactuated mirror made from a 430 $\mu$m×130 $\mu$m×15 $\mu$m nickel-iron plate attached to a pair of 400 $\mu$m×2.2 $\mu$m×2.2 $\mu$m polysilicon torsional beams may be rotated more than 90° out of the plane of the wafer and actuated with torque greater than 3.0 nN m. The torsional flexure structure constrains motion to rotation about a single axis, which can be an advantage for a number of microphotonic applications (e.g., beam chopping, scanning and steering). See the abstract of this publication.

A 1997 publication entitled *Magnetically Actuated, Addressable Microstructures* to Judy et al., Journal of Microelectromechanical Systems, Vol. 6, No. 3, September 1997, pp. 249–255, discloses that surface-micromachined, batch-fabricated structures that combine plated-nickel films with polysilicon mechanical flexures to produce individually addressable, magnetically activated devices have been fabricated and tested. Individual microactuator control was achieved in two ways: 1) by actuating devices using the magnetic field generated by coils integrated around each device and 2) by usingo electrostatic forces to clamp selected devices to all insulated ground plane while unclamped devices are freely moved through large out-of-plane excursions by an off-chip magnetic field. The disclosed application for these structures is micromirrors for microphotonic systems where they can be used either for selection from an array of mirrors or else individually for switching among fiber paths. See the abstract of this publication. Moreover, this publication discloses, at Page 253, four advantages of using electrostatic forces (instead of using integrated coils), to achieve individual microactuator control. These advantages include the following:

1) Arrays of elements can be readily addressed using well-known digital-memory address techniques.

2) The clamping scheme is easily incorporated in a batch-fabrication process.

3) Clamping is accomplished with very little increase in the area of an array in contrast to that needed for on-chip coils.

4) Although power is required to generate the magnetic field necessary to move unclamped devices, no static power is needed to clamp devices. An array of devices that could be clamped in the up position as well as the down position, would only need power to generate the magnetic field necessary to change the up-down configuration of the matrix.

Finally, a 1998 publication entitled *Magnetically Actuated Micromirrors for Fiber-Optic Switching* to Behin et al., Solid-State Sensor and Actuator Workshop, Hilton Head Island, S.C., Jun. 8–11, 1998, pp. 273–276, describes the design, fabrication and operation of magnetically actuated micromirrors with electrostatic clamping in dual positions for fiber-optic switching applications. The mirrors are actuated by an off-chip electromagnet and can be individually addressed by electrostatic clamping either to the substrate surface or to the vertically etched sidewalls formed on a top-mounted (110)-silicon chip. This publication shows the positioning accuracy inherent in this approach makes it suitable for N×M optical switches. See the abstract of this publication.

Other actuation techniques may be used to orient the reflectors of the array. For example, application Ser. No. 09/542,170, filed Apr. 5, 2000 (now U.S. Pat. No. 6,445, 842), entitled *Microelectromechanical Optical Cross-Connect Switches Including Mechanical Actuators and Methods of Operating Same* to Dhuler et al., and assigned to the assignee of the present invention, the disclosure of which is hereby incorporated herein by reference in its entirety, discloses MEMS OXC switches having mechanical actuators. In particular, the MEMS OXC switches can include a plurality of reflectors, wherein each of the plurality of the reflectors is movable to at least one of a respective first reflector position along a respective optical beam path from an associated input of the MEMS OXC switch to an associated output thereof and a respective second reflector position outside the optical beam path. A mechanical actuator moves to at least one of a first mechanical actuator position and a second mechanical actuator position. A selector selects ones of the plurality of reflectors to be coupled to the mechanical actuator and at least one of the plurality of reflectors to be decoupled from the mechanical actuator, wherein the mechanical actuator is coupled to the selected ones of the plurality of reflectors in the first actuator position and wherein the mechanical actuator moves the selected ones of the plurality of reflectors from the respective first reflector positions to the respective second reflector positions when the mechanical actuator moves from the first mechanical actuator position to the second mechanical actuator position. See the abstract of this patent application.

As the size of optical cross-connect switches continues to increase, it may become increasingly difficult to provide the requisite space for the control lines that control the switching of the individual electromechanical optical switches such as movable reflectors. In particular, in order to allow selection of an individual optical switch, a separate control line generally is provided for each switch. Thus, for an n×n array of movable reflectors, $n^2$ control lines may be needed. As the size of OXC devices increase, for example up to 1024×1024 arrays of reflectors or larger, up to one million or more control lines may be needed to individually address each reflector. These control lines may occupy significant area in the OXC device.

This area may be particularly excessive in MEMS OXC devices, wherein a single microelectronic substrate preferably contains the input optical paths, the output optical paths, the array of electromechanical optical switches and the individual control lines. Moreover, in an integrated circuit OXC device having four edges, the input optical paths and the output optical paths generally are provided on two adjacent edges and a pass-through output optical path generally is provided on a third edge opposite the input optical paths. This may allow only one edge to remain for electrical input/output connections. Even if up to one million or more individual control lines could be formed on a microelectronic substrate, it may be difficult to provide up to one million or more input/output connections on one edge of the microelectronic substrate.

SUMMARY OF THE INVENTION

Optical cross-connect switches according to embodiments of the present invention include a plurality of input optical paths, a plurality of output optical paths, and an array of electromechanical optical switches such as movable reflectors that are arranged in a plurality of rows of the electromechanical optical switches and a plurality of columns of the electromechanical optical switches, and that selectively move to couple the plurality of input optical paths to the plurality of output optical paths. A plurality of row address lines also are provided, a respective one of which is electromagnetically (i.e. electrically and/or optically) coupled to a respective row of the electromechanical optical switches. A plurality of column address lines also are provided, a respective one of which is electromagnetically coupled to a respective column of the electromechanical optical switches.

In embodiments of the invention, the electromechanical optical switches are configured to be selected upon selection of the respective row address line and column address line, but not to be selected upon selection of fewer than both (neither or only one) of the respective row address line and column address line. In other embodiments, the electromechanical optical switches are configured to be selected except for an electromechanical optical switch that is electromagnetically coupled to the respective row address line and column address line. In yet other embodiments, the plurality of input optical paths, the plurality of output optical paths, the array of electromechanical optical switches, the plurality of row address lines and the plurality of column address lines are on a microelectronic substrate, such as a silicon semiconductor substrate.

Optical cross-connect switches according to embodiments of the invention can provide a first plurality of electromechanical optical switches such as movable reflectors that selectively move to couple a plurality of input optical paths to a plurality of output optical paths. These embodiments of optical cross-connect switches also include a second plurality of electromagnetic control lines that are less than the first plurality and that are selectively electromagnetically coupled to the first plurality of electromechanical optical switches, to control the selective movement thereof. Thus, for example, if there are $n^2$ electromechanical optical switches that couple n input optical paths to n output optical paths, less than $n^2$ electromagnetic control lines may be provided. In other embodiments, the number of electromagnetic control lines is proportional to the number of rows plus the number of columns. Thus, 2n control lines, or a number of control lines that is proportional to 2n but less than $n^2$, may be provided.

In other embodiments of optical cross-connect switches according to embodiments of the present invention, each of the electromechanical optical switches includes a first electrode and a second electrode. A respective first electrode is electromagnetically coupled to a respective row address line and a respective second electrode is electromagnetically coupled to a respective column address line. In some embodiments, the electromechanical optical switches are configured such that activation of both the first and second electrodes by the respective row and column lines allows movement of the respective electromechanical optical switch, but activation of fewer than both of the first and second electrodes prevents movement of the respective electromechanical switch. In other embodiments, the electromechanical optical switches are configured such that activation of both the first and second electrodes by the respective row and column lines prevents movement of the respective electromechanical optical switch, but activation of fewer than both of the first and second electrodes allows movement of the respective electromechanical optical switch.

In yet other embodiments, the electromechanical optical switches each include a reflector that is movable between first and second positions, wherein the reflector can move from the first position to the second position when both the first and second electrodes are activated and are clamped in the first position otherwise. In some embodiments, the first and second clamping electrodes are attached to and move with, the reflector. In other embodiments, the electromechanical optical switches each includes a reflector that is movable between first and second positions, wherein the first electrodes are attached to and move wit the reflector and wherein the second electrodes are detached from and do not move the reflector.

In still other embodiments of the present invention, each of the electromechanical optical switches includes an electronic switch that is electrically coupled to the respective row and column line. In some embodiments, the electronic switch comprises a transistor, such as a field effect transistor having a controlling electrode such as a gate, and a pair of controlled electrodes, such as source and drain electrodes. The controlling electrode is electrically connected to one of the respective row and column line and one of the controlled electrodes is electrically connected to the other of the respective row and column line.

Embodiments of the present invention may be used with global actuators that apply a global actuation force to the array of electromechanical optical switches. The global actuator can apply a global electrostatic, magnetic, mechanical and/or other actuation force to the array of electromechanical optical switches.

Embodiments of the invention can include a plurality of input optical paths, a plurality of output optical paths, and an array of movable reflectors that are arranged in a plurality of rows of the movable reflectors and a plurality of columns of the movable reflectors. The movable reflectors selectively move between a first position that is outside the input optical paths, and a second position along at least one of the input optical paths. Each of the movable reflectors includes a first movable electrode and a second movable electrode that are attached thereto and move therewith.

A plurality of row address lines also are included, a respective one of which is electrically coupled to the first movable electrodes in a respective row of the movable reflectors. A plurality of column address lines also is included, a respective one of which is electrically coupled to the second movable electrodes in a respective column of the movable reflectors. A first clamp electrode also may be included that is adjacent the first position of the movable reflectors. A second clamp electrode also may be included that is adjacent the second position of the movable reflectors. The plurality of input optical paths, the plurality of output optical paths, the array of movable reflectors, the plurality of row address lines, the plurality of column address lines and the first clamp electrode may be included on a first substrate, such as a first microelectronic substrate. A second clamp electrode may be included on a second substrate, such as a second microelectronic substrate, that is spaced apart from and faces the first substrate.

A global magnetic actuator also may be included that applies a global magnetic actuation force to the array of movable reflectors that can move the reflectors from the first position to the second position. These embodiments may be operated by applying a predetermined voltage to the clamp electrode, a selected row address line and a selected column address line, to thereby cause the movable mirror that corresponds to the selected row address line and the selected column address line to move from the first position towards the second position in the presence of the global magnetic field. More specifically, a predetermined voltage is applied to the first clamp electrode, a selected row address line and a selected column address line, while simultaneously applying the global magnetic actuation force to the array., to thereby cause the movable mirror that corresponds to the selected row address line and the selected column address line to move from the first position toward the second position. The predetermined voltage then may be removed from the selected row address line and the selected column address line, while simultaneously applying the global magnetic actuation force to the array, the thereby clamp the movable mirror that corresponds to the selected row address line and the selected column address line to the second clamp electrode in the second position.

In other embodiments of optical cross-connect switches according to embodiments of the present invention, each of the movable reflectors includes a movable electrode that is attached thereto, and moves therewith, and a fixed electrode adjacent the first position that is detached from the movable reflector and does not move therewith. A respective one of the row address lines is electrically coupled to the fixed electrodes in the respective row of the movable reflectors, and a respective column address line is electrically coupled to the movable electrodes in a respective column of the movable reflectors. A clamp electrode also may be provided that is adjacent the second position of the movable reflectors. The plurality of input optical paths, the plurality of output paths, the array of movable reflectors, the plurality of row address lines, the plurality of column address lines and the fixed electrodes may be on a first substrate such as a microelectronic substrate, and the clamp electrode may be on a second substrate, such as a microelectronic substrate, that is spaced apart and faces the first substrate. A global magnetic actuator also may be provided.

In methods of operation of these embodiments of the invention, a predetermined voltage is applied to a selected row address line and a selected column address line, to thereby cause the mirror that corresponds to the selected row address line and the selected column address line to move from the first position toward the second position in the presence of the global magnetic field. More specifically, a predetermined voltage is applied to a selected row address line and a selected column address line, while simultaneously applying the global magnetic actuation force to the array, to thereby cause the movable mirror that corresponds to the selected row address line and the selected column address line to move from the first position toward the second position. Then, second and third voltages are applied to the selected row address line and the selected column address line, respectively, while simultaneously applying the global magnetic actuation force to the array to thereby clamp the movable mirror that corresponds to the selected row address line and the selected column address line to the clamp electrode in the second position.

Embodiments of the present invention also include electromechanical switch systems that selectively couple electrical inputs and outputs rather than optical inputs and outputs. Thus, an array of electromechanical switches are arranged in a plurality of rows of the electromechanical switches and a plurality of columns of the electromechanical switches, and selectively move to couple the plurality of inputs to the plurality of outputs. A plurality of row address lines and a plurality of column address lines are provided. A substrate also is provided, wherein the plurality of inputs, the plurality of outputs, the array of electromechanical switches, the plurality of row address lines and the plurality of column address lines are on the substrate. The switches may be configured to be selected in the various embodiments that were described above. Thus, electromechanical switching systems may be provided on a single substrate, such as microelectronic substrate, including and column address lines. Accordingly, the number of control lines may be reduced, as was described above.

BRIEF DESCRIPTION OF THE DRAWINGS

FIGS. 8–13 are schematic representations of optical cross-connect switches according to embodiments of the present invention during various operational phases of FIG. 7.

DETAILED DESCRIPTION OF PREFERRED EMBODIMENTS

Figure 1:
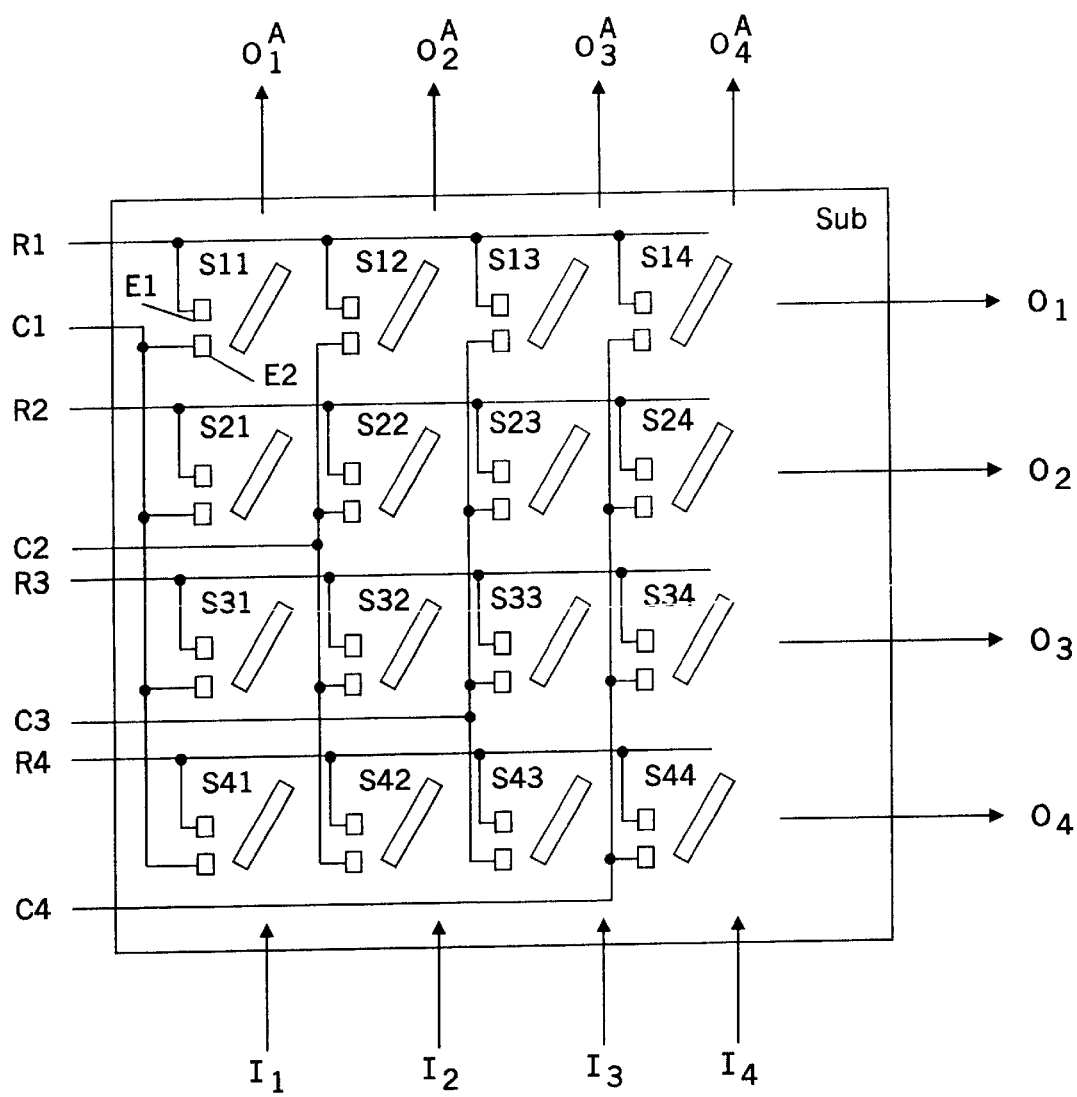
FIG. 1 is a schematic drawing of optical cross-connect switches according to embodiments of the present invention.

The present invention now will be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the thickness of layers and regions are exaggerated for clarity. Like numbers refer to like elements throughout. It will be understood that when an element such as a reflector is referred to as being "on" another element, it can be directly on the other element or intervening elements may also be present. In contrast, when an element is referred to as being "directly on" another element, there are no intervening elements present. Also, when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

As used herein, the term "optical radiation" can include radiation that can be used to transmit data in a communications system, such as radiation in the visible, ultraviolet, infrared and/or other portions of the electromagnetic radiation spectrum. Although the present invention is described herein by reference to MEMS actuators, it will be understood that the present invention may be utilized with other actuators. As used herein, the term optical "switch" can include optical devices that function as multiplexers, demultiplexers, and switches.

Referring now to FIG. 1, a schematic drawing of optical cross-connect switches according to embodiments of the present invention is shown. As shown in FIG. 1, these embodiments of optical cross-connect switches are formed on a substrate SUB which preferably is a microelectronic substrate such as a silicon semiconductor substrate. However, many other substrates may be used. A plurality, here four, of input optical paths $I_1$–$I_4$, and a plurality, here four, of output optical paths $O_1$–$O_4$ are provided. The input and output optical paths I and O may be free space and/or fiber optical paths. A plurality, here four, of passthrough optical output paths $O_1^A$–$O_4^A$ also are provided, which pass through the optical signals on the input optical paths $I_1$–$I_4$ in the absence of switching. As shown in FIG. 1, the substrate SUB includes four edges with the input optical paths and output optical paths on adjacent edges, and the passthrough optical output paths $O^A$ on an edge opposite the input optical paths.

An array, here sixteen, of microelectromechanical optical switches S11–S44 also are provided on the substrate, and are arranged in a plurality, here four, of rows, and a plurality, here four, of columns. It will be understood that the rows need not be horizontal and the columns need not be vertical. Rather, the terms "row" and "column" are merely used to indicate any two different directions on the substrate.

The electromechanical optical switches S are responsive to an electromagnetic (electrical and/or optical) signal to selectively couple the plurality of input optical paths I to the plurality of output optical paths O. The electromechanical optical switches preferably include reflectors such as mirrors. It will be understood by those having skill in the art that the movement may be a rotation about an axis that lies in the plane of the substrate, rotation about an axis that lies orthogonal to the substrate, translation along the substrate in any direction, movement into the substrate, movement away from the substrate and/or any other movement, as is well known to those having skill in the art. The electromechanical optical switches preferably include a reflector on one or more surfaces thereof, to selectively reflect an optical signal from an input optical path to an output optical path. The design of optical cross-connect switches as described in this paragraph is well known to those having skill in the art, and need not be described further herein.

Still referring to FIG. 1, these embodiments of optical cross-connect switches further include a plurality, here four, of row address lines R1–R4, a respective one of which is electromagnetically (electrically and/or optically) coupled to a respective row of the electromechanical optical switches. A plurality, here four, of column address lines C1–C4 also is included, a respective one of which is electromagnetically coupled to a respective column of the electromechanical optical switches. Preferably, the row address lines R1–R4 and the column address lines C1–C4 form input/output lines on a fourth edge of the substrate, opposite the output optical paths $O_1$–$O_4$.

As will be described in detail below, in some embodiments the electromechanical optical switches S are configured to be selected upon selection of the respective row address line R and column address line C, but not to be selected upon selection of neither or only one of the respective row address line and column address line. In other embodiments, the electromechanical optical switches S are configured to be selected except for an electromechanical optical switch that is electromagnetically coupled to the selected row address line and column address line. The selected electromechanical optical switch or switches may remain stationary, or may move, depending upon the configuration of the optical cross-connect switch.

As shown in FIG. 1, by providing a plurality of row address lines and a plurality of column address lines, the number of control lines can be less than the number of switches, and preferably equal or proportional to the sum of the number of rows and the number of columns. Thus, in the embodiments of FIG. 1, four rows and four columns of switches S11–S44 are provided, for a total of sixteen switches. Conventional optical cross-connect switches generally use sixteen control lines to individually select a switch. In contrast, embodiments of FIG. 1 can use four row address lines and four column address lines, for a total of eight control lines, which is equal to the sum of the number of rows and the number of columns, or less than the sum of the number of rows and the number of columns plus one. A reduced number of control lines thereby may be provided. Moreover, the reduction of control lines can continue as the number of input optical paths and/or output optical paths increases, because the row and column address lines can increase in proportion to the number of rows and number of Columns whereas, conventionally, the number of control lines increases in proportion to the total number of switches. Thus, for an n×n array of switches, 2n+2 control lines rather than $n^2+2$ control lines may be used, taking into account the control lines for the top and bottom electrodes that are described below.

Still referring to FIG. 1, each of the electromechanical optical switches S11–S44 includes a first electrode E1 and a second electrode E2. A respective first electrode E1 is electromagnetically coupled to a respective row address line R and a respective second electrode E2 is electromagnetically coupled to a respective column address line C. In some embodiments that will be described in detail below, the electromechanical optical switches S are configured such that activation of both the first and second electrodes E1 and E2 by the respective row and column address lines R and C, respectively, allows movement of the respective electromechanical optical switch, but activation of neither or only one of the first and second electrodes E1 and E2, respectively, prevents movement of the respective electromechanical optical switch. In other embodiments, the electromechanical optical switches S11–S44 are configured such that activation of both the first and second electrodes E1 and E2 by the respective row and column address lines R and C prevents movement of the respective electromechanical optical switch, but activation of neither or only one of the first and second electrodes E1 and E2 allows movement of the respective electromechanical optical switch.

In yet other embodiments that will be described below, the first and second electrodes may be attached to, and move with, the reflector. In yet other embodiments, the first electrodes are attached to, and move with, the reflector and the second electrodes are detached from and do not move with the reflector. Alternatively, the second electrodes may be attached to, and move with, the reflector, and the first electrodes may be detached from, and do not move with, the reflectors. The first and second electrodes can clamp the reflector in the first position or in the second position when both the first and second electrodes are activated, and can allow the reflector to move otherwise.

In still other embodiments that will be described in detail below, each of the electromechanical optical switches S11–S44 includes an electronic switch that is electrically coupled to the respective row and column line. The electronic switch may be a transistor such as a field effect transistor.

Other embodiments of the present invention can provide electromechanical switch systems that include a plurality of inputs that arc not optical inputs and a plurality of outputs that are not optical outputs. An array of electromechanical switches are arranged in the plurality of rows and a plurality of columns, and selectively moved to couple the plurality of inputs to the plurality of outputs. A plurality of row address lines and a plurality of column address lines also are provided. The plurality of inputs, the plurality of outputs, the array of electromechanical switches, the plurality of row address lines and the plurality of column address lines are provided on a common substrate, such as a microelectronic substrate. Accordingly, electromechanical switching arrays may be provided that switch, for example, electrical input signals, and can include a reduced number of control lines due to the row and column addressing. The reduced number of control lines compared to an individual control line for each switch can allow these electromechanical switch systems to be fabricated on a common microelectronic substrate.

Figure 2A:
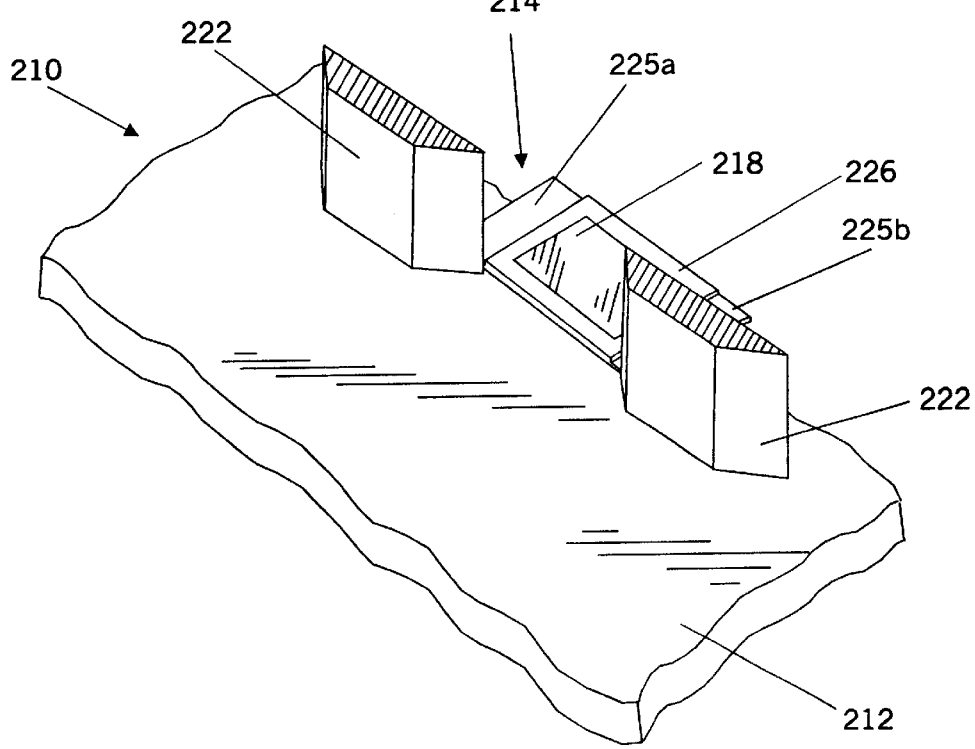
FIGS. 2A and 2B are perspective views of optical cross-connect switches according to embodiments of the invention illustrating a positional relationship between a non-reflective state and a reflective state.
Figure 2B:
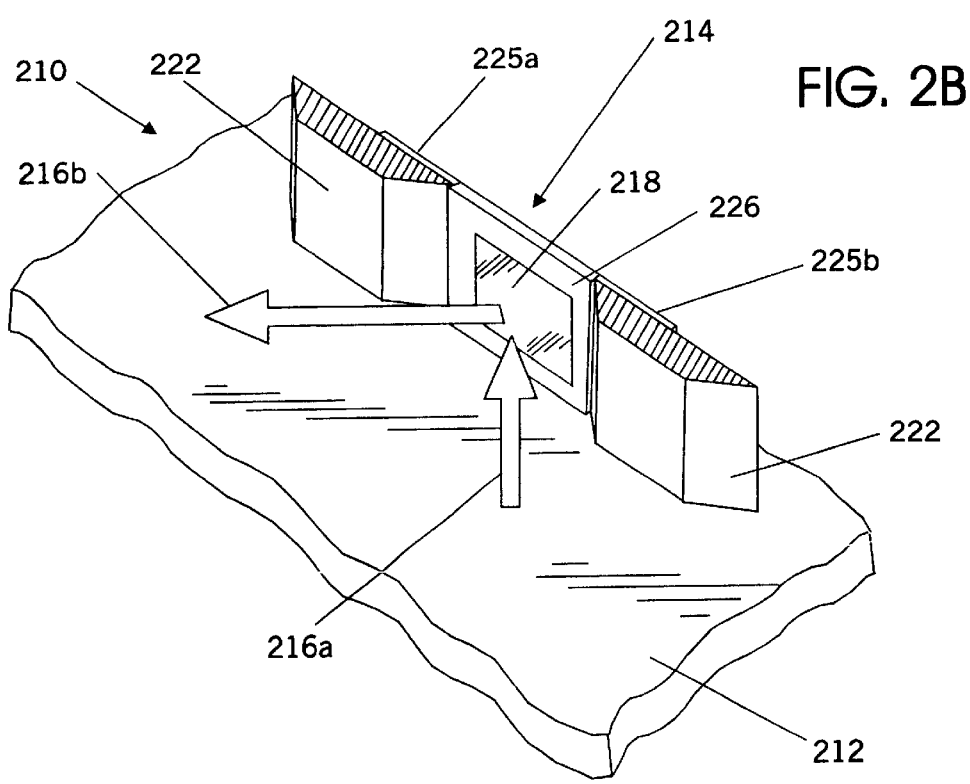

FIGS. 2A and 2B are perspective views of MEMS electromechanical optical switches according to embodiments of the invention, illustrating a positional relationship between a non-reflective state of an electromechanical optical switch and a reflective state of the electromechanical optical switch. A switch 210 includes a first substrate 212, such as a microelectronic substrate, having a generally planar surface. The first substrate may comprise silicon, although other suitable semiconductor or non-semiconductor materials may also be used. The electromechanical optical switches of these embodiments include mirror assemblies 214 that rotate from parallel to the substrate 212 to orthogonal to the substrate 212. These mirror assemblies also are referred to herein as "pop-up mirrors" 214. Thus, as shown in FIG. 2A, a pop-up mirror 214 is disposed on the surface of the first substrate 212. In FIG. 2A, the pop-up mirror is positioned in a plane that lies generally parallel to the surface of the first substrate. In this pop-up mirror orientation, referred to herein as the non-reflective state, optical signals may pass by the mirror without being altered or reflected. In contrast, in FIG. 2B, the pop-up mirror 214 is positioned in the plane that lies generally perpendicular to the surface of the first substrate 212. In this pop-up mirror orientation, referred to herein as the reflective state, an input optical signal, represented in FIG. 2B by arrow 216a will contact the reflective surface 218 of the pop-up mirror 214 and change the optical path to produce an output optical signal 216b.

The optical cross-connect switch may also comprise a second substrate, such as a second microelectronic substrate, that is disposed in a fixed positional relationship relative to the first substrate, preferably spaced apart from and facing the first substrate. The second substrate is not shown in the simplified perspective views of FIGS. 2A and 2B, but will be described in detail below. One or more positioning structures may be disposed relative to the first substrate 212 and the pop-up mirror 214, to impede further movement of the pop-up mirror beyond the desired reflective state. They also may include clamping electrodes that clamp the mirror 214 in the reflective state, as will be described in detail below. In the embodiments shown in FIGS. 2A and 2B, the positioning structures 222 are pillar-like structures extending from the second substrate toward the planar surface of the first substrate 212. The positioning structures 222 may approach but not contact the first substrate 212, to provide electrical isolation between the first and second substrates. In other embodiments, they may contact the second substrate. In still other embodiments, an insulating layer may be provided either on the first substrate 212 or on the end portion of the positioning structures that will allow the positioning structures to come into contact with the first substrate 212 and still maintain electrical isolation.

As shown in FIG. 2B, the pop-up mirror 214 is restricted from further movement by the two positioning structures 222. Moreover, tabs 225a and 225b that are coupled to the sides of the pop-up mirror 214 and can contact each positioning structure 222, to restrict the movement of the pop-up mirror 214. It is also possible to configure the positioning structures so that the pop-up mirror contacts and is restricted by only one positioning structure. In some embodiments of the present invention, the tabs 225a and 225b are electrically isolated from one another, to form first and second movable electrodes for the pop-up mirror 214 that move with the pop-up mirror. In other embodiments, the tabs 225a and 225b are electrically connected to one another to form a single movable electrode for the pop-up mirror. It also will be understood that the reflective surface 218 may be positioned on the opposite side of the pop-up mirror 212 from that shown in FIGS. 2A and 2B.

Figure 3A:
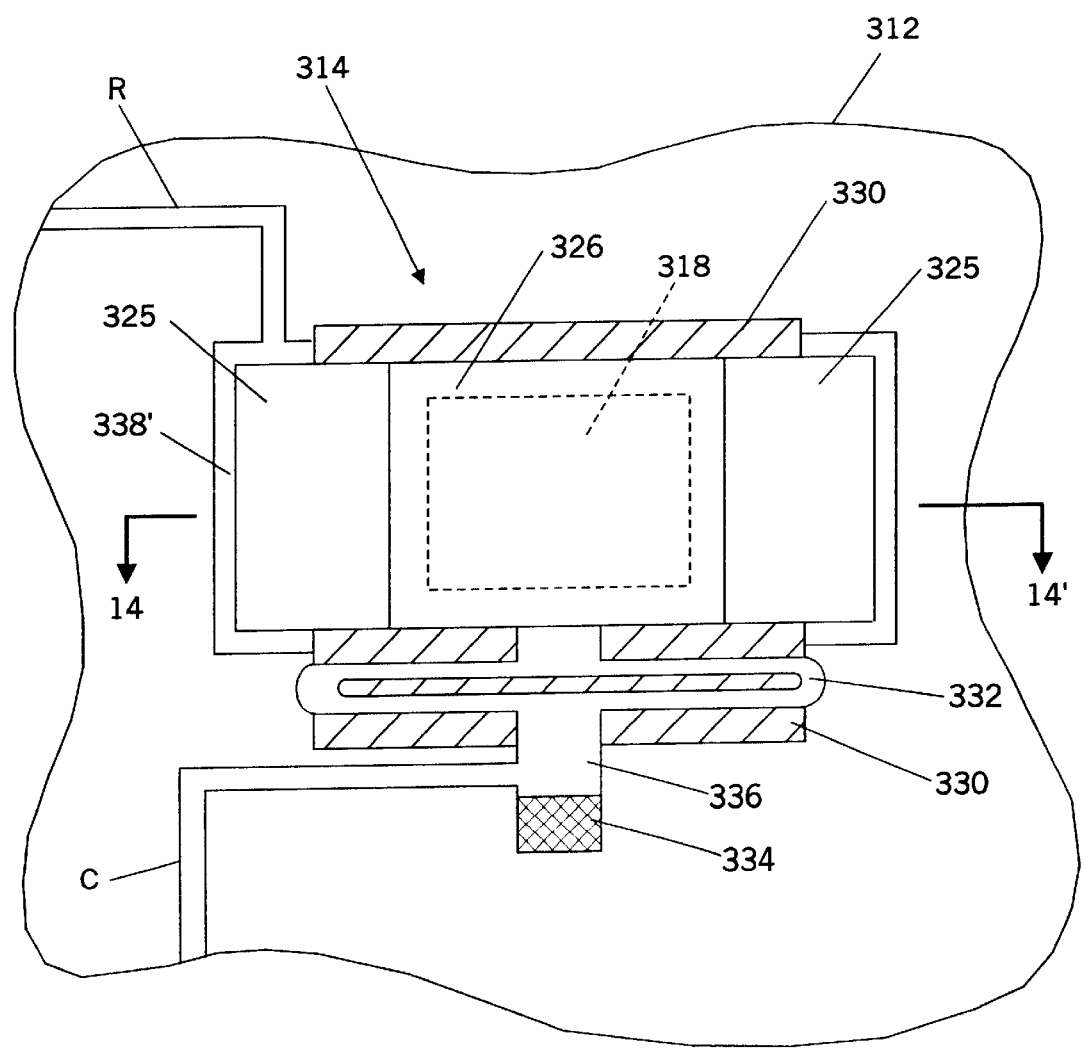
FIG. 3A is a top view of pop-up mirrors according to embodiments of the present invention.

Embodiments of pop-up mirrors are shown in more detail in the top view of FIG. 3A. The pop-up mirror 314 is disposed on a generally planar surface of a first substrate 312. A sacrificial layering process may be employed during the fabrication of the pop-up mirror to allow for the mirror to be released from the surface of the first substrate 312 and overlie a trench 330 in the first substrate. The trench 330 can provide electrical isolation between the pop-up mirror 314 and the substrate and also can reduce problems related to the pop-up mirror sticking to the substrate (commonly referred to as "stiction" force by those of ordinary skill in the art) during fabrication and during device use. In lieu of fabricating a trench, it also may be possible to texture the underside of the pop-up mirror, the substrate or both surfaces with a dimple-like array pattern. The dimpled surface may provide less contact surface area between the mirror and substrate, thus, lessening the problems encountered with stiction.

Still referring to FIG. 3A, tabs 325 can restrict further movement of the pop-up mirror 314 upon actuation and rest upon the substrate 312 in the non-actuated position and serve to support the pop-up mirror 314 above the trench 330. The tabs 325 may be electrically conductive to provide a movable electrode that moves with the pop-up mirror 314, so that a voltage that is applied to the tabs may serve to clamp the pop-up mirror in an actuated reflective position or in a non-actuated, non-reflective position.

A tether device 332 is used to impart mobility to the pop-up mirror and provide an electrical path for transmitting electrostatic voltage to the tabs 325 of the pop-up mirror. As shown in the embodiments of FIG. 3A, the tether device 332 may comprise an elongated oval shaped tether, commonly referred to as a hairpin tether. This configuration of the tether 332 can provide a robust and flexible structure. The use of tether devices and more specifically, hairpin tethers is shown by way of example. Other tether configurations and flexible hinge type mechanisms also may be used to impart the desired mobility to the attached pop-up mirror 314. For clarity sake only, FIGS. 2A and 2B did not illustrate a tether device or hinge type mechanism.

Figure 3B:
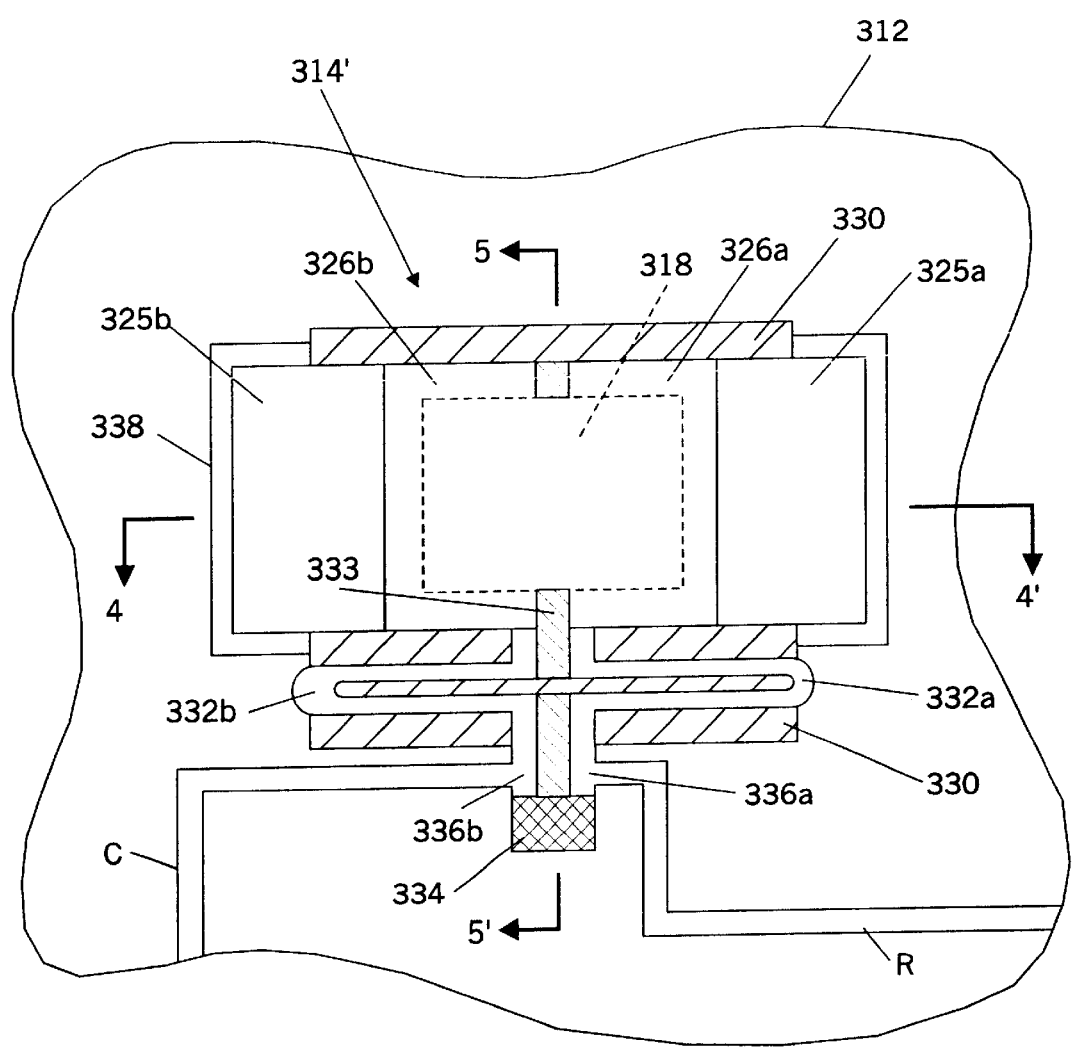
FIG. 3B is a top view of other pop-up mirrors according to embodiments of the present invention.

The tether device 332 is attached to the substrate at an anchor 334. The tether device 332 can impart a force to hold the pop-up mirror in the stationary non-reflective state (i.e. generally parallel to the substrate 312). In these embodiments, the hairpin tether also can provide a bending and/or twisting of the oval-shaped tether to restore the pop-up mirror 314 from the reflecting state to the non-reflecting state. The tether device 332, the anchor 334, the tabs 325 and an underlying base plate of the pop-up mirror (not shown in FIG. 3A) may comprise the same material, such as polysilicon. It is also possible to form the tether device, the anchor, the tabs and/or the underlying base plate from other flexible, electrically conductive materials. If the anchor, the tether device, the tabs and the underlying base plate of the pop-up mirror comprise one material, such as polysilicon, it is possible to form the structures during a single fabrication process. The reflective surface 318 of the pop-up mirror 314 may comprise gold or other suitable reflective materials. In FIGS. 3A and 3B, the reflective surface 318 is on the bottom surface of the pop-up mirror 314. However, the reflective surface also may be on the top surface as shown in FIGS. 2A and 2B. The frame 326 that surrounds the reflective surface may comprise electroplated nickel. The frame 326 of the pop-up mirror 314 can provide rigidity to the overall pop-up mirror and, in some embodiments, can provide a magnetically active material. Other materials that provide similar characteristics may also be used to form the frame structure. In some embodiments, the frame 326 and the reflective surface 318 may be on the same face of the pop-up mirror 314. In other embodiments, the frame 326 may be on the opposite face as reflective surface 318. When the frame is on the opposite face, nickel plating may be used on a portion or all of the surface. When on the entire opposite face, the nickel plating still may be regarded a frame, because it includes a supporting and/or magnetically active layer.

Still referring to FIG. 3A, according to embodiments of the present invention, a respective column address line C is electromagnetically, here electrically, coupled to the tab 325 via the tether device 332. Thus, the tab 325 can provide a movable first electrode. The coupling of column line C to the tether device 332 may take place at a coupling point 336, at the anchor 334 and/or at other points. Thus, the tab 325 forms a movable column electrode, also referred to herein as a column flap electrode 325. As also shown in FIG. 3A, a row address line R is electromagnetically, here electrically, coupled to a stationary electrode 338' on the substrate 312. Thus, the electrode 338' can provide a stationary second electrode. It will be understood that in other embodiments, the tab 325 may be electrically coupled to the row address line and the substrate electrode 338' may be coupled to the column address line.

FIG. 3B describes alternate embodiments of pop-up mirrors 314' according to other embodiments of the present invention. In FIG. 3B, two portions 332a and 332b, here halves, of the hairpin tether device are electrically isolated from one another by an insulating layer 333 and tab electrode portions also are electrically isolated from one another using the same insulating layer 333 and/or a different insulating layer, to provide electrically isolated tabs 325a and 325b. The right hand tab 325a is electrically connected to the row address line R via the right half of the frame 326a, the right half of the tether 332a, at a coupling point 336a, to thereby provide a row flap electrode 325a that moves with the pop-up mirror 314'. Similarly, the left tab 325b is electrically connected to the column address line C via the left half of the frame 326b and the left half of the tether device 332b, to provide a column flap electrode 325b that moves with the pop-up mirror 314'. Operation of optical cross-connect switches using embodiments of FIGS. 3A and 3B according to embodiments of the present invention will be further described in detail below.

In contrast, in conventional magnetically actuated OXC devices using electrostatic clamping, the substrate may be used as a single global electrode and the mirror flaps may be used as an addressable electrode that forms the second electrode of the capacitor between the mirror flap and the substrate, to provide electrostatic clamping. Thus, conventionally, a separate control line may be used for each mirror in the array, to individually address each mirror. Thus, for an n×n array of mirrors, $n^2$ control lines may be needed.

In some embodiments of the invention a pop-up mirror is actuated by the use of a magnetic field that extends generally orthogonal to the first and second substrates. As a magnetic field is applied that is generally orthogonal to the first and second substrates, a magnetically active pop-up mirror will attempt to align itself with the direction of the field. An electrostatic field may be applied to the pop-up mirror to hold the mirror in a stationary non-reflective position (i.e. parallel to the first substrate). If a magnetic field is employed, the electrostatic field should be of such strength that it overrides the magnetic field. Once the electrostatic field is removed, the magnetic field can become dominant and provide force to actuate the pop-up mirror. In embodiments using magnetic field actuation, the frame and/or other layer may serve as the magnetically active component of the pop-up mirror. The magnetic field that may be used may comprise external permanent magnets, electromagnets and/or any other magnets capable of generating the requisite magnetic field.

In some embodiments of the invention the optical cross connect switch may employ an external magnetic field that generates a magnetic field generally perpendicular to the planar surface of the first substrate. Such a magnetic field may be generated by the use of a permanent magnet or electromagnets. The magnetic field typically may be on the order of 200–500 gauss. An electromagnet,net may be located below the surface of the first substrate and serves to generate a magnetic field generally perpendicular to the first and second substrates. The magnetic field can cause the magnetic component of the pop-up mirror to align with the axis of the magnetic field, creating torque acting against the torsion of the tether. The use of an electromagnet is described by way of example. Other magnetic field generators, such as permanent magnets, also may be used to generate the magnetic field.

Figure 4:
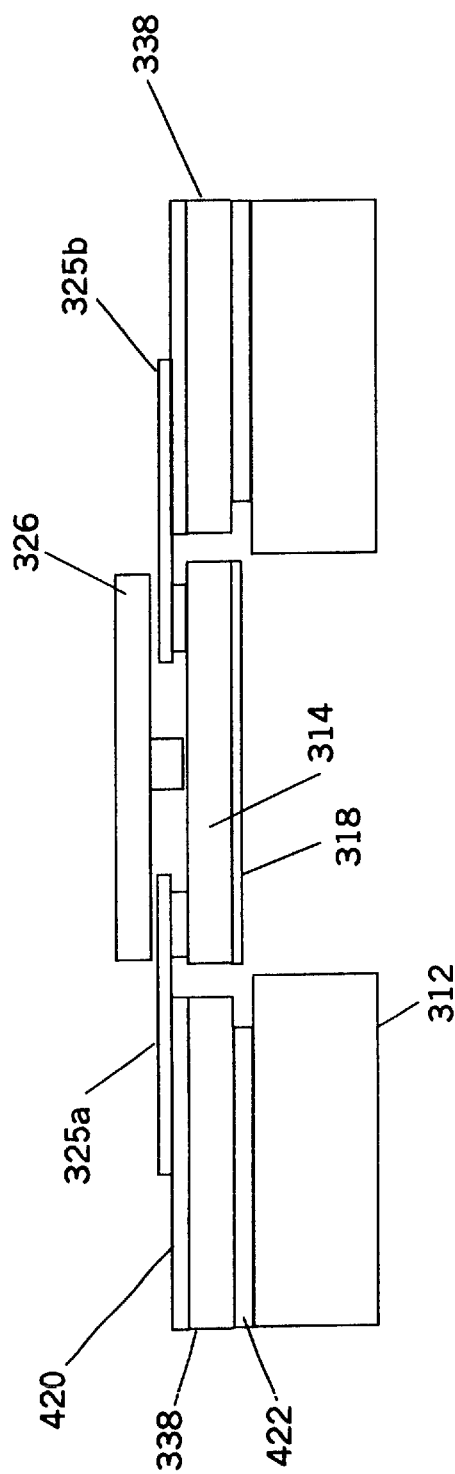
FIG. 4 is a cross-sectional view taken along the line 4–4' of FIG. 3B.

FIG. 4 is a cross-sectional view of FIG. 3B, taken along the line 4–4' of FIG. 3B, and may be regarded as a "unit cell" of embodiments of electromechanical optical switches according to embodiments of the present invention. The row flap electrode 325a also will referred to as a row clamp electrode 325a and the column flap electrode 325b also will be referred to as a column clamp electrode 325b. The row clamp electrodes 325a in a row of the array are all connected in common and the column clamp electrodes 325b in a column of the array are all connected in common. The stationary electrode 338 on the substrate 312 also will be referred to herein as a bottom or lower clamp electrode 338.

Figure 5:
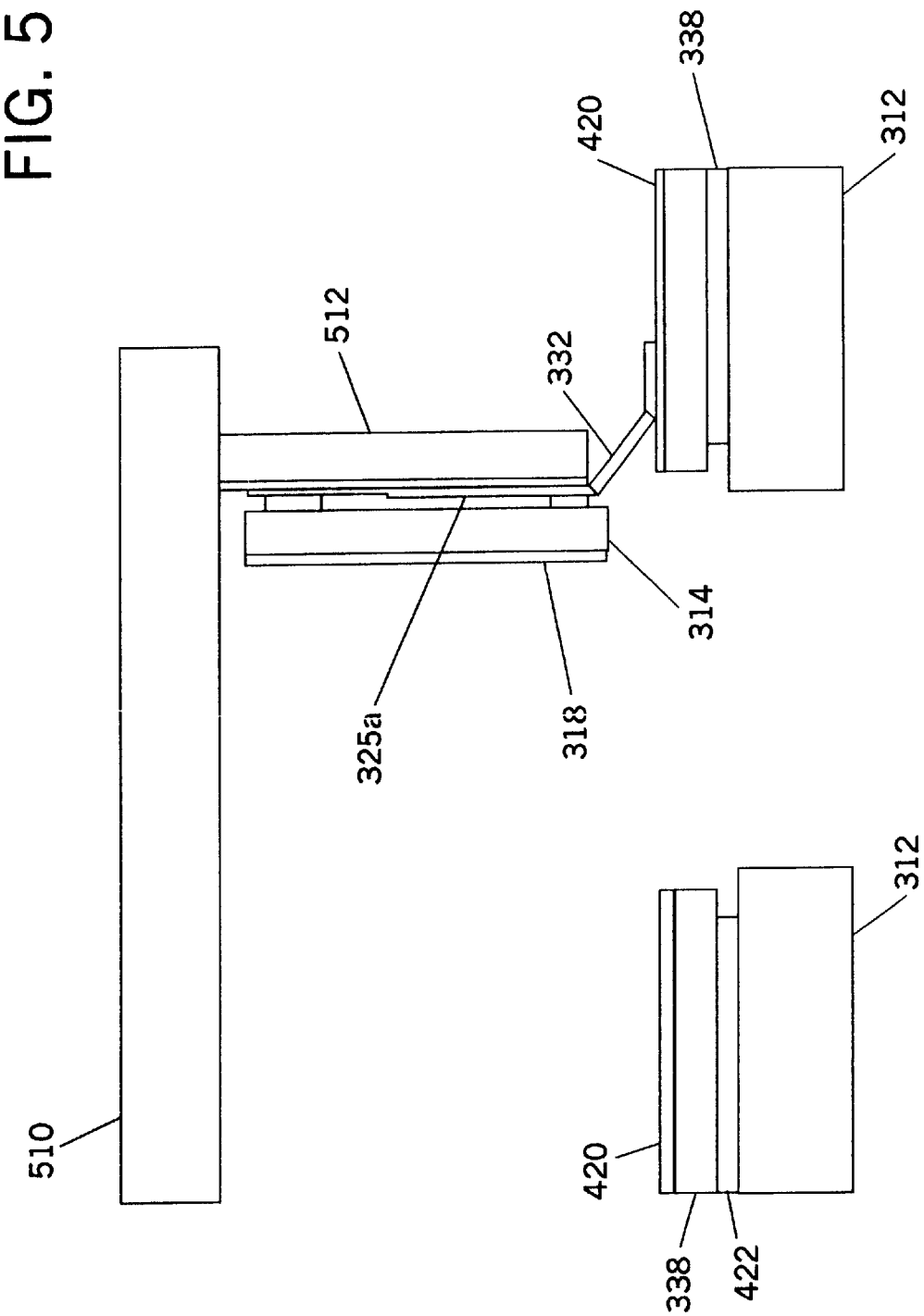
FIG. 5 is a cross-sectional view taken along the line 5–5' of FIG. 3B.

FIG. 5 is a cross-sectional view taken along the line 5–5' of FIG. 3B, and illustrates a "bed-of-nails" second substrate 510, which includes an upper clamp electrode 512 in and/or on the nails or protrusions thereof. It will be understood that the upper clamp electrode 512 may be defined using a conductive layer on the nail and/or by providing a conductive or partially conductive nail using techniques well-known to those having skill in the art and as described in detail in the above-cited application Ser. No. 09/489,264. It also will be understood that FIG. 5 is a simplified cross-sectional view, wherein only features of the devices that are relevant to the clamping of mirrors are shown. The pole pieces, electromagnet and external magnet circuit are not shown for clarity. However, embodiments of these elements are illustrated in the aforesaid application Ser. No. 09/489,264.

Embodiments of FIGS. 3B, 4 and 5 may be used in an m×n array or an n×n array, with the column clamp electrodes 325b of each mirror 314' in a column of the array electrically coupled together as a column control line C. The column control line may be brought off the substrate 312 for external control. Similarly, the row clamp electrodes 325a of each row of mirrors in the array are electrically connected as the row control lines R and may be brought off the substrate 312 for external control. Thus, for an n×n array of mirrors, 2n control lines may be used. This can result in fewer control lines and signals for n>2, and can result in less area for routing and wire bonding on an n×n OXC substrate.

All of the upper clamp electrodes 512 may be coupled together electrically on the bed-of-nails substrate 510 so that only a single electrical connection may be used. Similarly, the lower clamp electrodes 338 all may be coupled together electrically so that a single electrical connection may be used.

Figure 6:
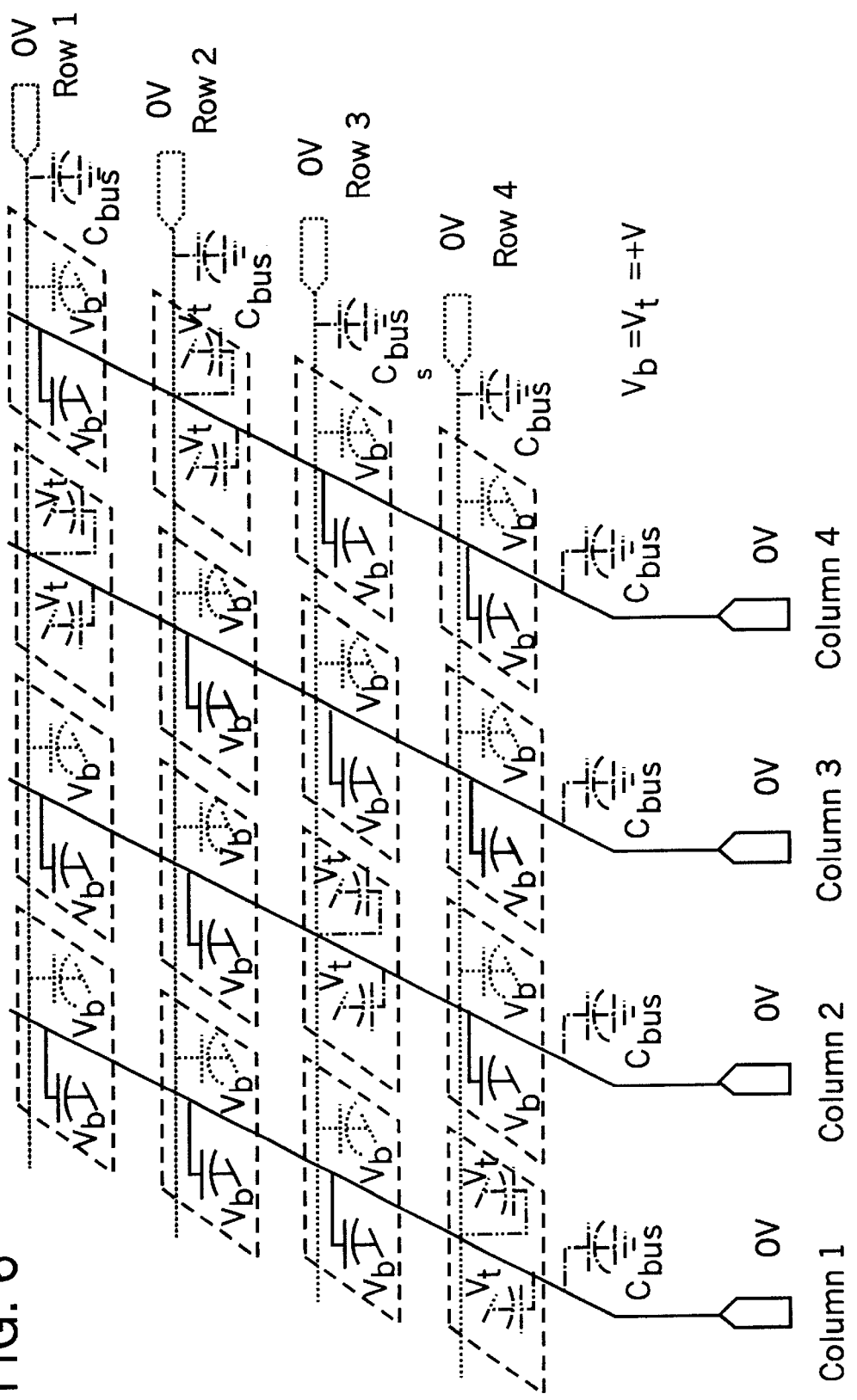
FIG. 6 is an electrical schematic diagram of 4×4 optical cross-connect switches according to embodiments of the present invention.

FIG. 6 is an electrical schematic diagram of embodiments of a 4×4 array of FIGS. 3B, 4 and 5, including parasitic bus capacitances $C_{bus}$ that generally will be present between signal lines and the substrate. Operations for configuring embodiments of an n×n OXC and/or individual mirror operations for strictly non-blocking n×n OXC switches will be described in connection with the flowchart of FIG. 7, and are illustrated conceptually in FIGS. 8–13

It will be understood that the operations of the flowchart of FIG. 7 and FIGS. 8–13 may be performed by a controller that is located on the same substrate 312 as the optical cross-connect switch and/or external to the substrate 312 ("off-chip"). The overall design of controllers for optical cross-connect switches are well known to those having skill in the art and need not be described further herein. Moreover, although operations now will be described using voltages +V and 0V, other voltages may be used. Finally, although the bottom clamp electrode 338 and top clamp electrode 512 are shown as being maintained at the same voltage +V, they may be maintained at different voltages, as long as potential differences with the row and column flap electrodes 325a and 325b are maintained as described below. It also will be understood that in all of FIGS. 3A-21, the optical paths are not shown for the sake of clarity.

Figure 7:
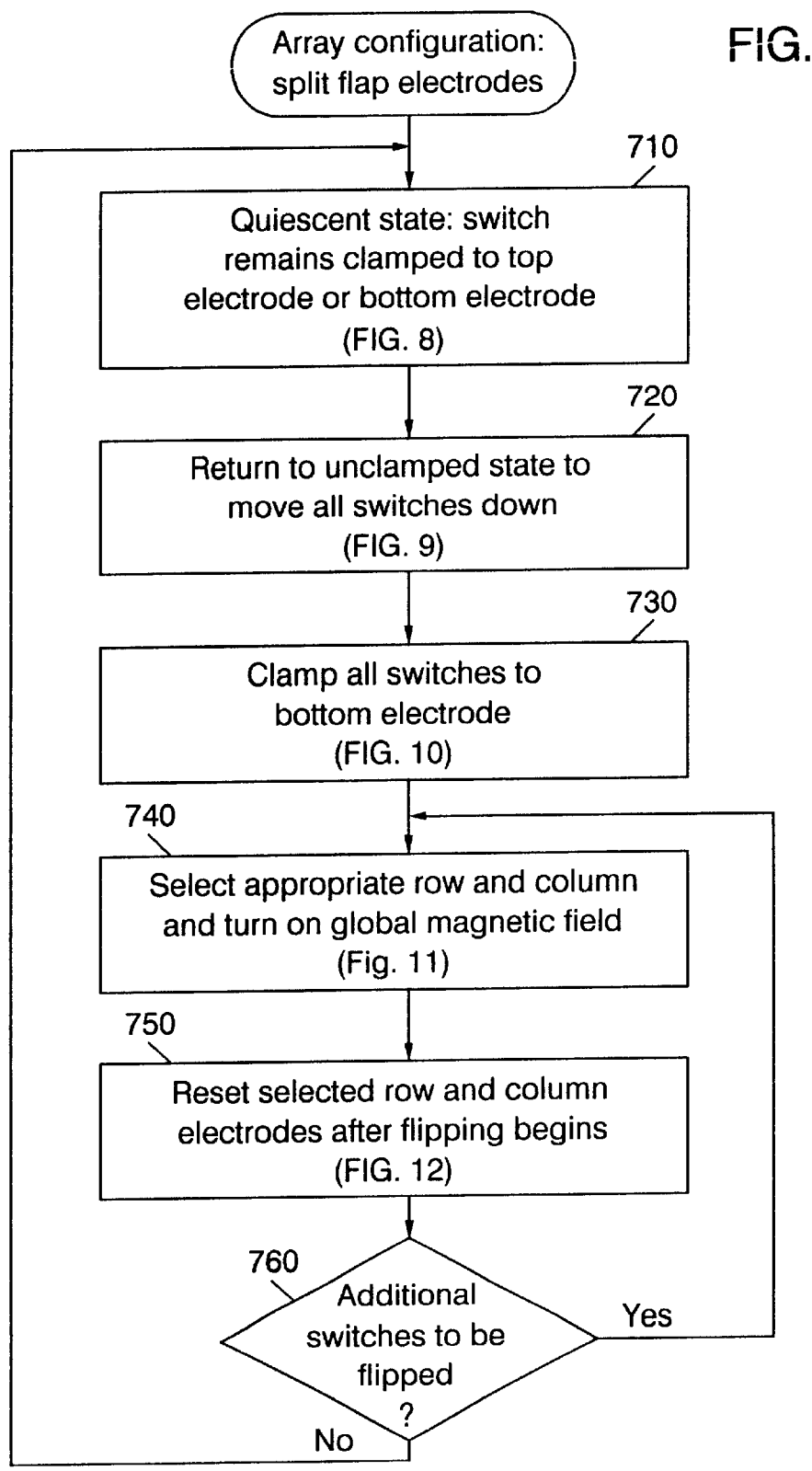
FIG. 7 is a flowchart illustrating operations for configuring n×n optical cross-connect switches according to embodiments of the present invention.

Referring now to FIG. 7, at Block 710, in the quiescent state, each pop-up mirror 314' remains clamped to either the top clamp electrode 512 or the bottom clamp electrode 338. As shown in the embodiments of FIG. 8, the top and bottom clamp electrodes 512 and 338 are maintained at +V, for example by connecting these electrodes to a power supply voltage +V. All the row and column lines R1–R4 and C1–C4 are connected to ground (0V). No global magnetic field B is applied. In this state, a voltage V is present across all the down and up mirror electrostatic clamp capacitors that are formed between the row and column clamp electrodes 325a and 325b and/or the frame sections 326a and 326b, and either the bottom clamp electrode 338 or the top clamp electrode 512.

It will be understood that the voltage V prefer-ably is selected to be sufficient to ensure clamping of the mirror in both up and down states of the mirror, even in the presence of the global magnetic field B that is used for actuation to flip mirrors up. Moreover, the potential V preferably is chosen to be sufficient to ensure clamping of the mirror in both the up and down states of the mirror, even when the potential V appears only across only one of the row flap electrode 325a or the column flap electrode 325b. Thus, in FIG. 8, all of the mirrors 314' remain in their existing configuration. Thus, switches S13, S24, S32 and S41 are clamped in the up position to switch the input optical path to the output optical paths, whereas the remaining switches remain clamped in their down position, so as not to block an input optical path.

Referring now to Block 720 of FIG. 7 and to FIG. 9, the global magnetic field B is turned off or remains off and all the row and column control lines R1–R4 and C1–C4 are connected to the power supply voltage +V, to unclamp all the mirrors in the up state and bring them down, as indicated by the arrows 910 in FIG. 9. The torque imparted by the tether 332 can restore the mirrors to the non-reflective state.

Then, at Block 730 of FIG. 7 and in FIG. 10, all of the row and column lines R1–R4 and C1–C4 are connected to 0V, thereby clamping all of the mirrors 314' to the bottom electrode.

Then, as shown in Block 740 of FIG. 7 and in FIG. 11, a selected row and column electrode is brought to +V, and the global magnetic actuation B field is applied. In the example of FIG. 11, row R2 and column C2 are both connected to +V, and the global magnetic field B is turned on. This unclamps the switch S22 in the selected position, since both the row and column flap electrodes 325a and 325b for this switch S22 have zero potential drop with respect to the bottom clamp electrode 338. Thus, the switch S22 will start to move up in the presence of the global magnetic field B. It will be understood that the remaining switches S21, S23 and S24 in the second row that have their row flap electrodes 325a connected to +V, but their column flap electrodes 325b at 0V will not be flipped because the potential drop V still is present. Similarly, the remaining switches in the second column that have only one electrode at +V, i.e. switches S12, S32 and S42, also will not flip. Finally, the remaining switches that have both their row flap electrodes 325a and column flap electrodes 325b at 0V also will not flip.

Referring now to Block 750 of FIG. 7 and to FIG. 12, after a predetermined time at which the moving mirror is out of the "recapture" zone of the bottom electrode 338, the selected row and column lines again may be connected to 0V. This resetting is performed so that the flipped mirror can clamp to the top clamp electrode 512, as shown in FIG. 12.

Then, referring to Block 760 of FIG. 7, a determination is made if additional switches are to be flipped. If yes, the operations of Block 740 and 750 corresponding to FIGS. 11–12 are again performed. If not, operations return to the quiescent state of Block 710 and FIG. 8.

FIG. 13 illustrates a final configuration, wherein four switches S11, S22, S23 and S44 are flipped, to thereby switch input $I_1$ to output $O_1$, input $I_2$ to output $O_2$, input $I_3$ to output $O_3$ and input $I_4$ to output $O_4$. Thus, the OXC has been reconfigured.

It will be understood by those having skill in the art that the above-described embodiments of FIGS. 3B-13 have been described in the context of magnetically global actu-ated optical cross-connect switches, but can be extended for nonmagnetically actuated optical cross-connect switches and also may be extended to any array of other switching devices that can use global actuation and electrostatic clamping to clamp the device in initial and final states, and/or other electromechanical switching arrays. In the embodiments of FIGS. 3B-13, the clamping electrode is separated into two portions, one a row portion and the other a column portion.

Other embodiments of the invention now will be described. In particular, as was described in connection with FIG. 3A, these embodiments of optical switches do not employ a split flap electrode. Rather, each flap electrode 325 is electrically connected to an appropriate column address line C. The lower or bottom clamp electrodes 338' are not all connected in common, but rather are connected to an appro-priate row address line R. Thus, in contrast with FIG. 3B, the lower electrode 338' is patterned so that all of the lower electrodes 338' in a row are connected to a row address line R.

Figure 14:
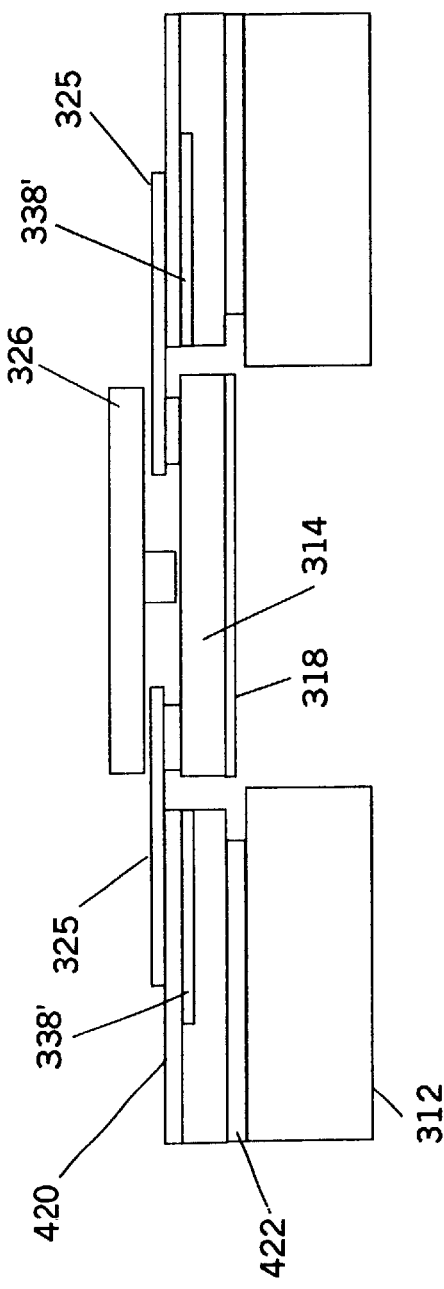
FIG. 14 is a cross-sectional view taken along the line 14–14' of FIG. 3A.

FIG. 14 is a cross-sectional view taken along the line 14-14' of FIG. 3A. In FIG. 14, an individual lower electrode 338' is provided below each flap electrode 325. The lower electrode 338' can be fabricated by implanting dopant into the face of the substrate 312 through a mask, by depositing an additional conductive layer such as polysilicon and/or by using other conventional techniques. The left and right portions of the lower electrode 338' for each individual switch are electrically connected together, as are the two portions of the flap electrode 325. The flap electrodes 325 of each switch in a column of the array are electrically coupled together as a column address signal C. The column address signals may be brought off-chip. Similarly, the bottom electrodes 338' of each row of switches in the array are electrically connected as row address lines R and may be brought off-chip. Thus, for an n×n array of switches 2n+2 control lines may be used.

Figure 15:
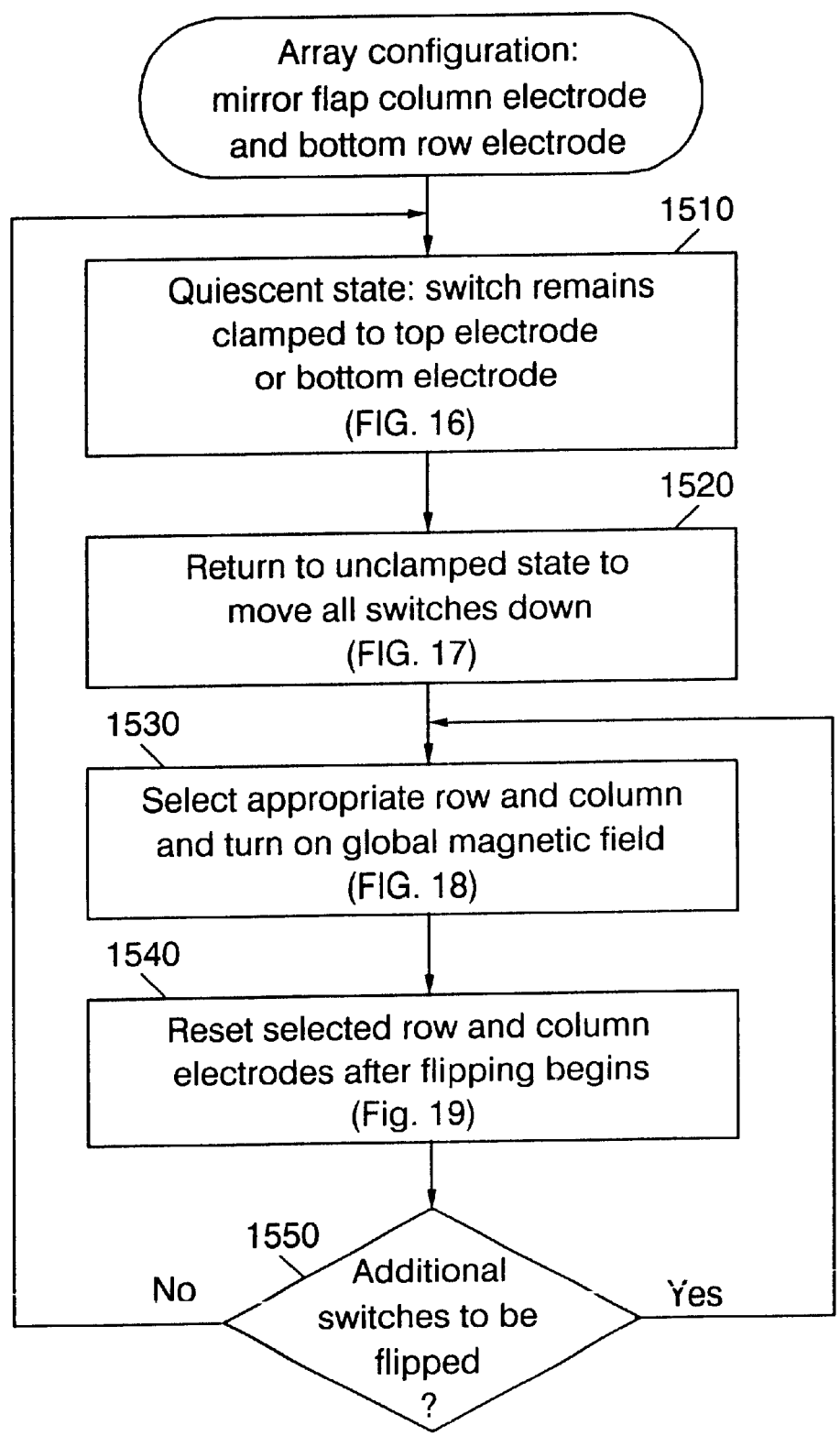
FIG. 15 is a flowchart illustrating other operations for configuring n×n optical cross-connect switches according to embodiments of the present invention.

FIG. 15 is a flowchart illustrating operations for config-uring an array of switches according to embodiments of FIGS. 3A and 14. Rather than describe the array of switches in a schematic top view, as was the case for FIGS. 8–13, the operations of FIG. 15 will be described using electrical schematic diagrams of FIGS. 16–20, including the capaci-tances of the switches.

Figure 16:
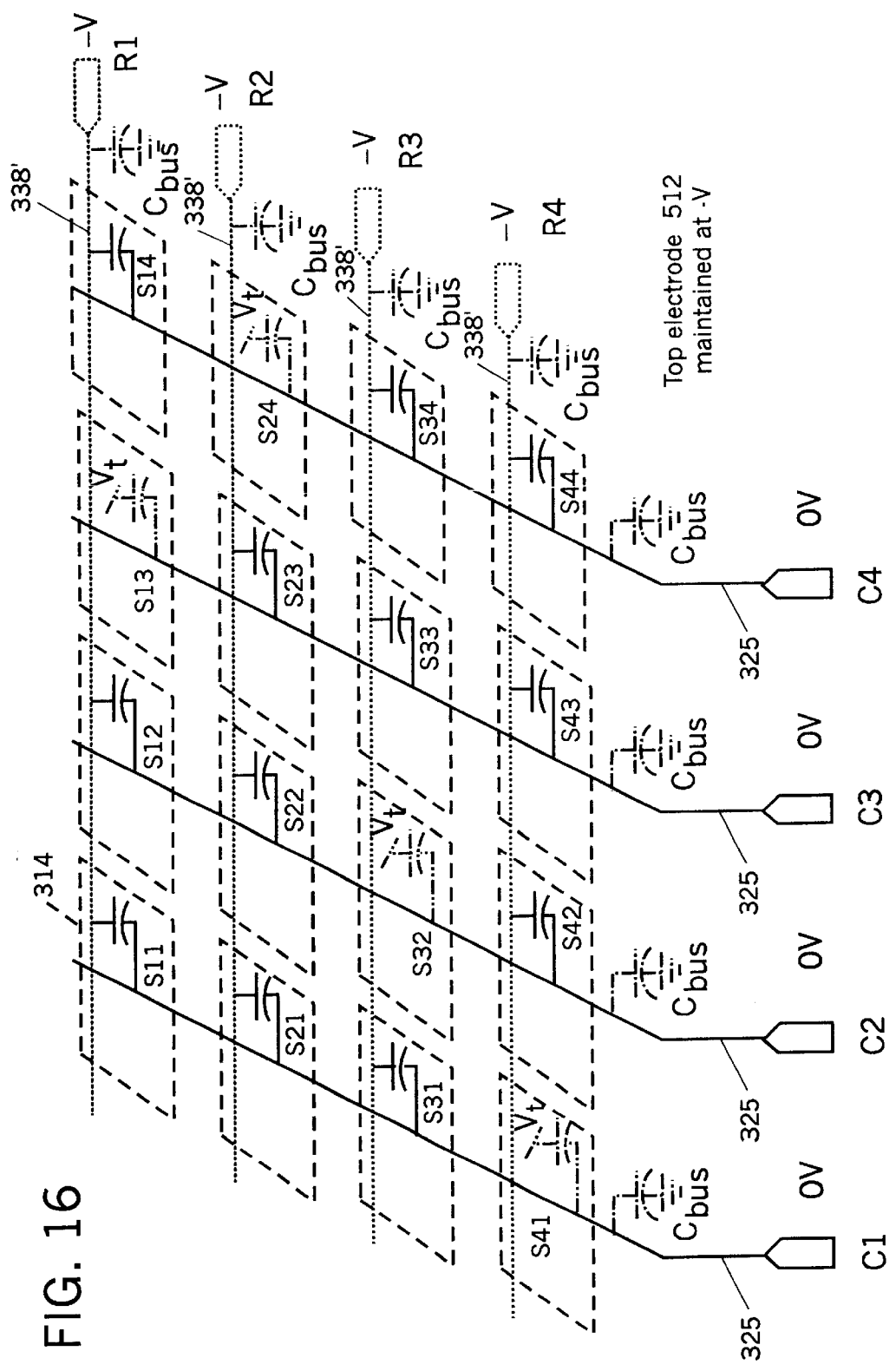
FIGS. 16–20 are schematic representations of optical cross-connect switches according to embodiments of the present invention during various operational phases of FIG. 15.

Referring now to FIG. 15, in the quiescent state as shown at Block 1510, each of the switches remains clamped to the top electrode 512 or the bottom electrode 338'. This is illustrated in the electrical schematic diagram of FIG. 16. As shown in FIG. 16, all of the row address lines R1–R4, corresponding to the patterned bottom electrodes 338', are maintained at a first voltage such as −V, and all of the column electrodes C1-C4, corresponding to the column flap electrodes 325 are maintained at 0V. The top electrode 512 also is maintained at −V. Thus, since the flap electrodes are maintained at 0V and the top electrode 512 and the bottom electrodes 338' are maintained at −V, clamping to the top or bottom electrodes will take place. In this state, a voltage V is present across all the down and up switches. The potential V is selected to be sufficient for clamping in both up and down states of the mirror, even in the presence of the global magnetic field B that is used for actuation to flip mirrors up. During the quiescent state, however, the global magnetic field preferably is not applied.

As shown in FIG. 16, switches S13, S24, S32 and S41 are clamped up, with the voltage of the top electrode 512 being indicated by $V_r$. The remaining switches are clamped down with the voltage $-V$ appearing between the bottom electrode 338' and the flap electrode 325. The bus capacitance $C_{bus}$ also is shown.

Figure 17:
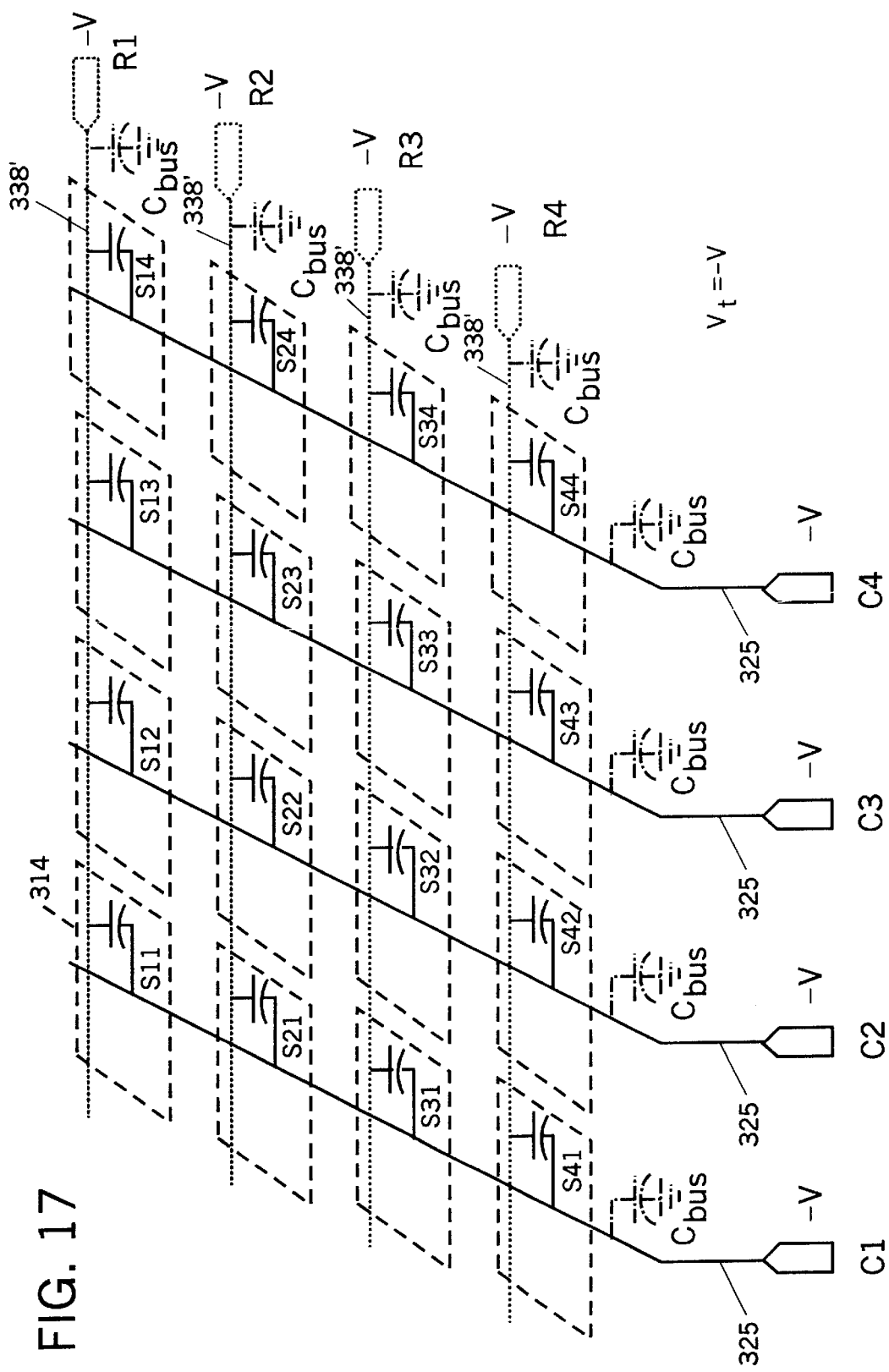

Referring now to Block 1520 of FIG. 15 and to FIG. 17, the switches are all returned to their unclamped state to move all of the switches down. In particular, as shown in FIG. 17, all the column control lines are connected to $-V$, to unlatch all the switches in the current up state and rotate them down, due to the restoring force of the tether 332. Thus, as shown in FIG. 17, all of the flaps are shown as down, and are clamped to the bottom electrode 338.

Figure 18:
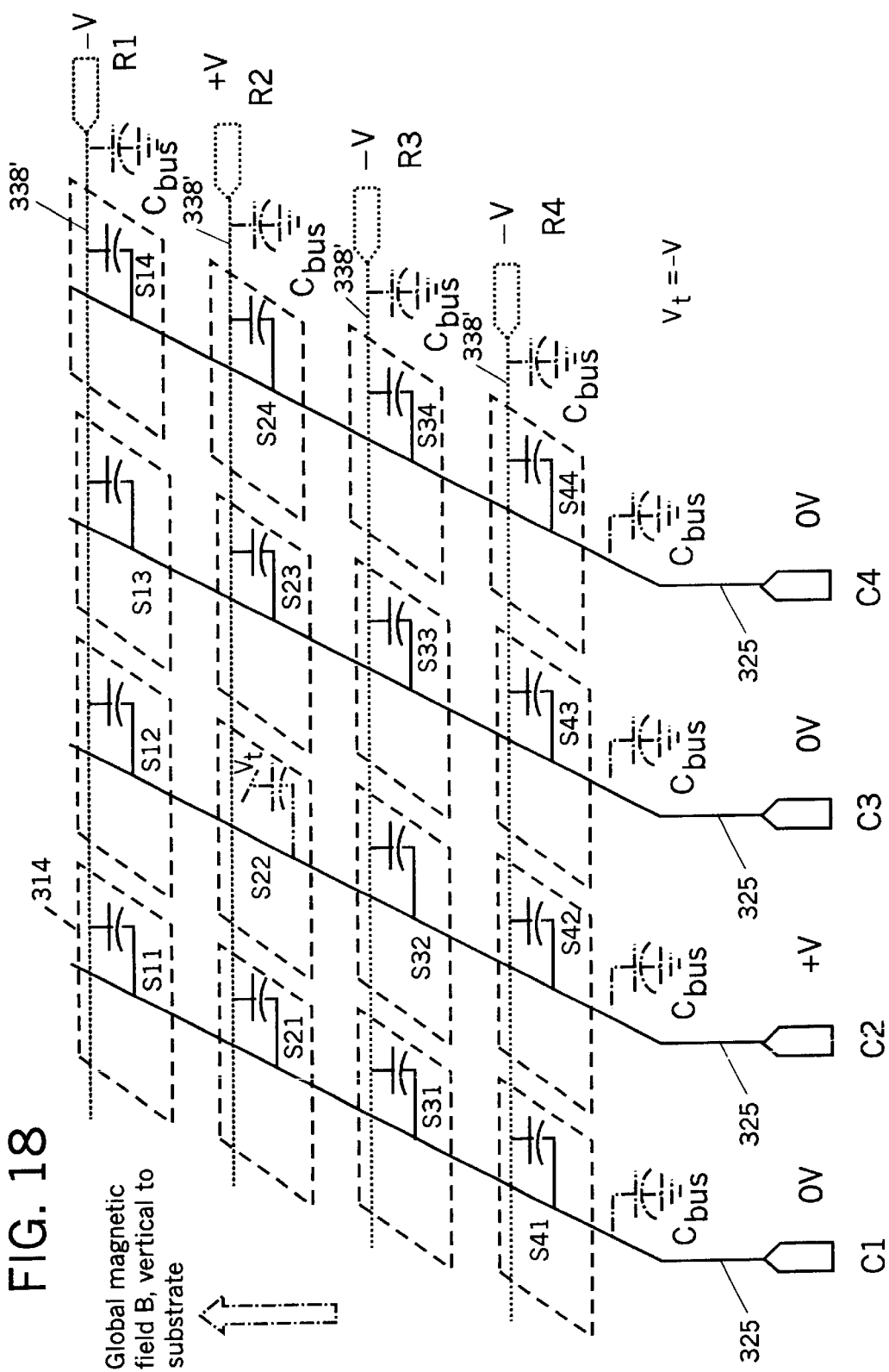

Referring now to Block 1530 of FIG. 15 and to FIG. 18, a potential $+V$ is applied to the column and row select lines of the switch positions to be flipped up. For example, as shown in FIG. 18, the potential of row R2 and column C2 is changed from $-V$ to $+V$. All the other column select lines are maintained at 0V, and all the other row lines are maintained at $-V$. This clamps all the switches except the switch S22 in the selected row and column. The global magnetic field B then is applied, for example by providing current to an electromagnet. This will cause the unclamped switch, switch S22 in FIG. 13, to begin flipping up.

Figure 19:
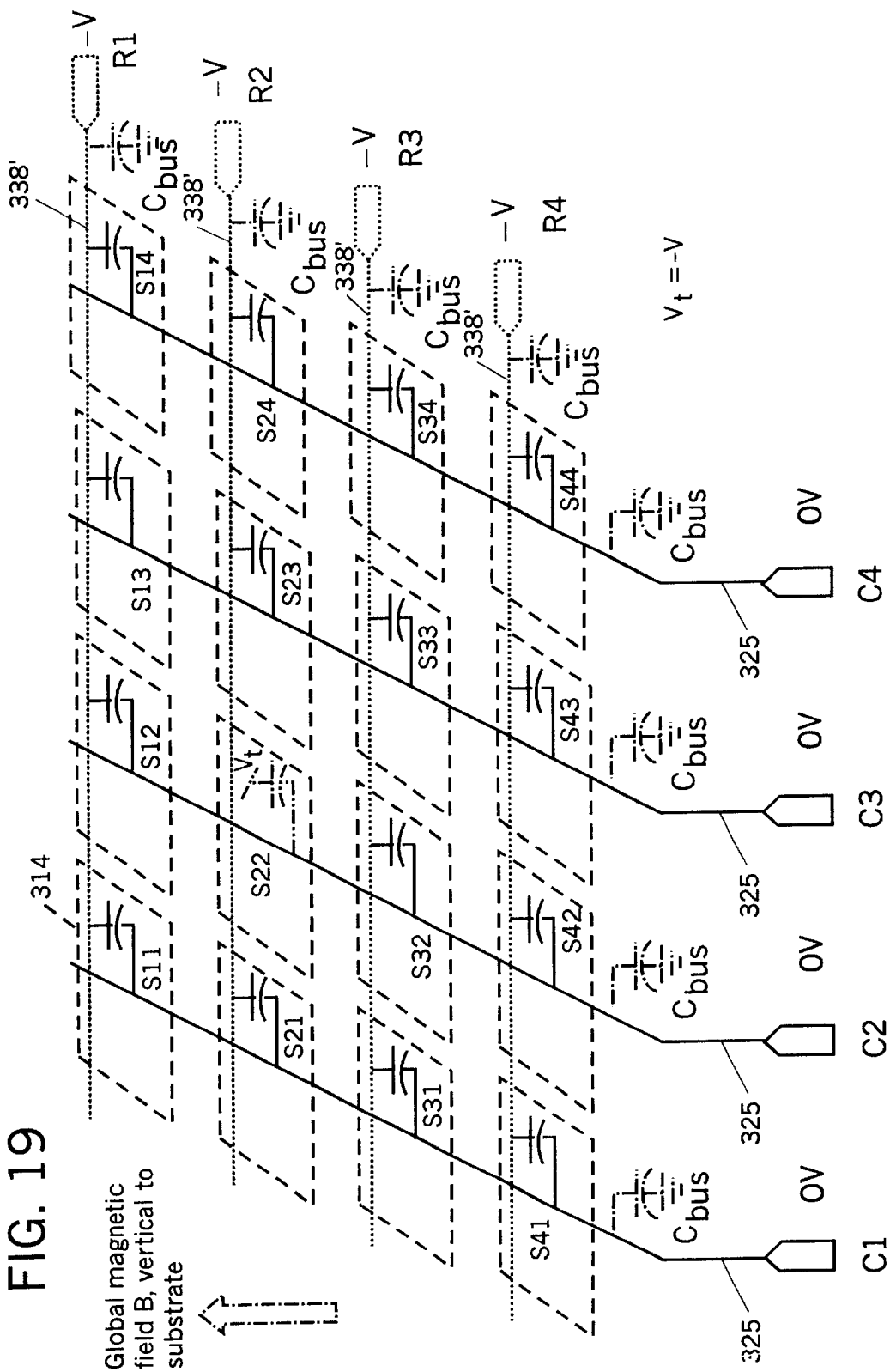

Then, referring to Block 1540 of FIG. 15 and to FIG. 19, after a predetermined time at which the moving switch is out of the "recapture" zone of the bottom electrode 338', the selected column and row address lines, here C2 and R2, are set back to their steady state levels of 0V and $-V$, respectively.

Figure 20:
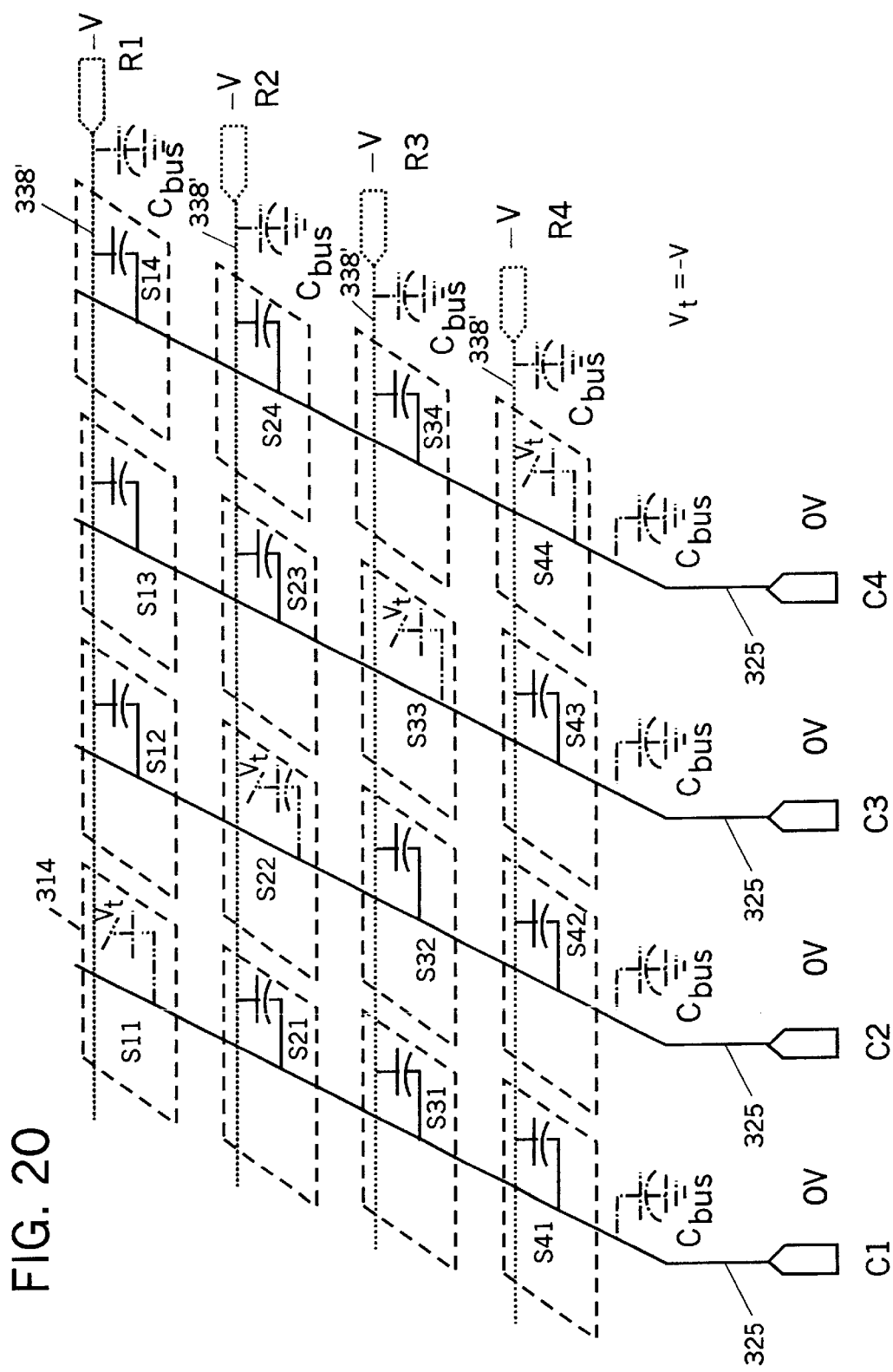

Referring now to Block 1550 of FIG. 15, if additional switches are to be selected, then the operations of Blocks 1530 and 1540, corresponding to FIGS. 18 and 19, are again repeated. A final configuration is shown in FIG. 20, in which switches S11, S22, S33 and S44 have been flipped. Global actuation then may be turned off and the quiescent state is obtained.

Figure 21:
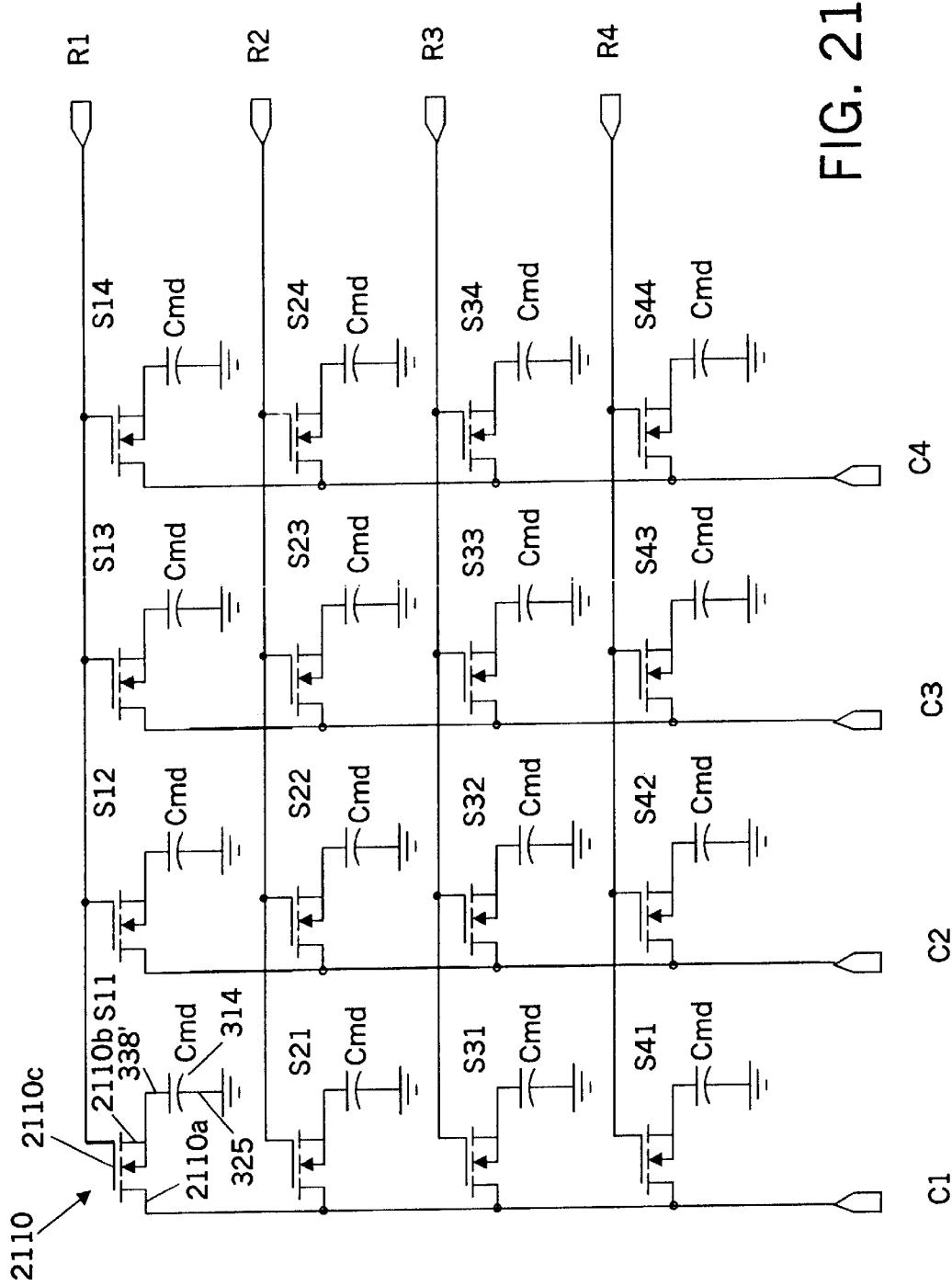
FIG. 21 is an electrical schematic diagram of other optical cross-connect switches according to embodiments of the present invention in which electronic switches also are used.

FIG. 21 is an electrical schematic diagram of other embodiments of the present invention, in which an electronic switch 2110 is electrically coupled to the respective row and column lines. The electronic switch may include one or more bipolar transistors, field effect transistors and/or other electronic switching devices. In embodiments of FIG. 21, a field effect transistor is shown, including a controlling electrode (gate) 2110c and a pair of controlled electrodes (source or drain) 2110a and 2110b. The controlling electrode 2110c is connected to the corresponding row address line R1–R4 and one of the controlled electrodes 2110a is connected to the corresponding column line C1–C4. The other controlling electrode 2110b is connected to the lower clamp electrode 338'. All of the flap electrodes 325 are connected to ground.

It will be understood that embodiments of FIG. 21 may need to use more complex fabrication processes in order to fabricate transistors on the same microelectronic substrate as the electromechanical switches 312. Moreover, a dynamic charge storage scheme similar to refreshing of a Dynamic Random Access Memory (DRAM) that includes transistor and a capacitor, also may need to be provided during the time the optical cross-connect switches are reconfigured. Unlike a conventional DRAM, charge refresh may not be needed in the quiescent state.

In order to configure embodiments of optical cross-connect switches of FIG. 21, all the switches are reset, for example by applying 0V to all of the row lines R and/or all of the column lines C, to turn off the transistors 2110. The column lines C1–C4 then all are precharged or set to the voltage $+V$ or 0V based upon whether the column includes the switch to be flipped. The row select then is enabled to charge all the clamp capacitors Cmd in the selected row to the desired voltage. These operations then are performed on the next row. After all the clamp capacitors Cmd in the array have the desired voltage, the global magnetic field B may be applied to flip the unclamped mirrors up and clamp them in the up position. The magnetic field then may be removed. These operations may be analogized to writing operations of a one-transistor DRAM, and need not be described further herein.

It will be understood by those having skill in the art that although the above-described embodiments have been described in terms of orthogonal rows and columns, the rows and columns need not be orthogonal to one another. Rather, the terms "row" and "column" have been used arbitrarily to indicate two different directions in a Cartesian, radial and/or other coordinate system. Moreover, voltages other than those which were described may be used, and different configuration sequences also may be used. Moreover, although the optical paths have been omitted from FIGS. 3A-21, it will be understood that the input optical paths $I_1$–$I_4$ and the output optical paths $O_1$–$O_4$ of FIG. 1 may be present in all embodiments of OXCs of FIGS. 3A-21. Although the embodiments have been described in terms of 4×4 arrays, any arbitrary number of rows and columns may be used. Other row and column addressing schemes also may be used.

Although the switches have been exemplified as mirrors that flip about an axis of rotation that is in the plane of the substrate, other actuation techniques may be used. Embodiments of the present invention also may be applied to other electromechanical switch systems such as relay switch systems that switch electrical signals in response to an electromagnetic input, rather than optical switches that switch optical signals. Finally, although the switches have been illustrated as being on a single substrate, multiple substrates also may be used, and multiple substrates may be coupled to one another to create larger devices.

In the drawings and specification there have been disclosed typical preferred embodiments of the invention and, although specific terms are employed, they are used in a generic and descriptive sense only and not for purposes of limitation, the scope of the invention being set forth in the following claims.

What is claimed is:

1. An optical cross-connect switch comprising:
    a plurality of input optical paths;
    a plurality of output optical paths;
    an array of electromechanical optical switches that are arranged in a plurality of rows of the electromechanical optical switches and a plurality of columns of the electromechanical optical switches and that selectively move to couple the plurality of input optical paths to the plurality of output optical paths;
    a plurality of row address lines, a respective one of which is electromagnetically coupled to a respective row of the electromechanical optical switches; and
    a plurality of column address lines, a respective one of which is electromagnetically coupled to a respective column of the electromechanical optical switches.

2. An optical cross-connect switch according to claim 1 wherein the electromechanical optical switches are configured to be selected upon selection of the respective row address line and column address line but not to be selected upon selection of fewer than both of the respective row address line and column address line.

3. An optical cross-connect switch according to claim 1 wherein the electromechanical optical switches are configured to be selected except for an electromechanical optical switch that is electromagnetically coupled to the selected row address line and column address line.

4. An optical cross-connect switch according to claim 1 further comprising a substrate, and wherein the plurality of input optical paths, the plurality of output optical paths, the array of electromechanical optical switches, the plurality of row address lines and the plurality of column address lines are on the substrate.

5. An optical cross-connect switch according to claim 1 wherein each of the electromechanical optical switches includes a first electrode and a second electrode, wherein a respective first electrode is electromagnetically coupled to the respective row address line and wherein a respective second electrode is electromagnetically coupled to a respective column address line.

6. An optical cross-connect switch according to claim 5 wherein the electromechanical optical switches are configured such that activation of both the first and second electrodes by the respective row and column lines allows movement of the respective electromechanical optical switch but activation of fewer than both of the first and second electrodes prevents movement of the respective electromechanical optical switch.

7. An optical cross-connect switch according to claim 5 wherein the electromechanical optical switches are configured such that activation of both the first and second electrodes by the respective row and column lines prevents movement of the respective electromechanical optical switch but activation of fewer than both of the first and second electrodes allows movement of the respective electromechanical optical switch.

8. An optical cross-connect switch according to claim 5 wherein the electromechanical optical switches each includes a reflector that is movable between first and second positions, wherein the reflector can move from the first position to the second position when both the first and second electrodes are activated and is clamped in the first position otherwise.

9. An optical cross connect switch according to claim 5 wherein the first and second clamping electrodes are attached to and move with the reflector.

10. An optical cross-connect switch according to claim 5 wherein the electromechanical optical switches each includes a reflector that is movable between first and second positions, wherein the first electrodes are attached to and move with the corresponding reflector and wherein the second electrodes are detached from and do not move with the corresponding reflector.

11. An optical cross-connect switch according to claim 1 wherein each of the electromechanical optical switches includes an electronic switch that is electrically coupled to the respective row and column line.

12. An optical cross-connect switch according to claim 11 wherein the electronic switch comprises a transistor having a controlling electrode and a pair of controlled electrodes, wherein the controlling electrode is electrically connected to one of the respective row and column lines and wherein one of the controlled electrodes is electrically connected to the other of the respective row and column lines.

13. An optical cross-connect switch according to claim 1 further comprising:
a global actuator that applies a global actuation force to the array of electromechanical optical switches.

14. An optical cross-connect switch according to claim 13 wherein the global actuator applies at least one of a global electrostatic, magnetic and mechanical actuation force to the array of electromechanical optical switches.

15. An optical cross-connect switch comprising:
a first plurality of electromechanical optical switches that selectively move to couple a plurality of input optical paths to a plurality of output optical paths; and
a second plurality of electromagnetic control lines that are less than the first plurality and that are selectively electromagnetically coupled to the first plurality of electromechanical optical switches to control the selective movement thereof.

16. An optical cross-connect switch according to claim 15 wherein the first plurality of electromechanical optical switches are arranged in a third plurality of rows and a fourth plurality of columns and wherein the second plurality is proportional to a sum of the third plurality and the fourth plurality.

17. An optical cross-connect switch according to claim 16 wherein the first plurality of electromechanical optical switches are arranged in a third plurality of rows and a fourth plurality of columns and wherein the second plurality is equal to a sum of the third plurality and the fourth plurality.

18. An optical cross-connect switch according to claim 15 further comprising a substrate, and wherein the first plurality of electromechanical optical switches, the plurality of input optical paths, the plurality of output optical paths and the second plurality of electromagnetic control lines are on the substrate.

19. An optical cross-connect switch according to claim 15 further comprising:
a global actuator that applies a global actuation force to the first plurality of electromechanical optical switches.

20. An optical cross-connect switch comprising:
an array of electromechanical optical switches that are arranged in m rows of the electromechanical optical switches and n columns of the electromechanical optical switches and that selectively move to couple m input optical paths to n output optical paths; and
fewer than m×n electromagnetic control lines that are selectively electromagnetically coupled to the array of electromechanical optical switches to control the selective movement thereof.

21. An optical cross-connect switch according to claim 20 wherein the fewer than m×n electromagnetic control lines is fewer than m+n+1 control lines.

22. An optical cross-connect switch according to claim 20 further comprising a substrate, and wherein the array of electromechanical optical switches, the m input optical paths, the n output optical paths and the fewer than m×n electromagnetic control lines are on the substrate.

23. An optical cross-connect switch according to claim 20 further comprising:
a global actuator that applies a global actuation force to the electromechanical optical switches.

24. An optical cross-connect switch comprising:
a plurality of input optical paths;
a plurality of output optical paths;
an array of movable reflectors that are arranged in a plurality of rows of the movable reflectors and a plurality of columns of the movable reflectors and that selectively move between a first position that is outside the input optical paths and a second position along at least one of the input optical paths, each of the movable reflectors including a first movable electrode and a second movable electrode that are attached thereto;
a plurality of row address lines, a respective one of which is electrically coupled to the first movable electrodes in a respective row of the movable reflectors; and a plurality of column address lines, a respective one of which is electrically coupled to the second movable electrodes in a respective column of the movable reflectors.

25. An optical cross-connect switch according to claim 24 further comprising a first clamp electrode that is adjacent the first position of the movable reflectors and a second clamp electrode that is adjacent the second position of the movable reflectors.

26. An optical cross-connect switch according to claim 24 further comprising a substrate, wherein the plurality of input optical paths, the plurality of output optical paths, the array of movable reflectors, the plurality of row address lines and the plurality of column address lines are on the substrate.

27. An optical cross-connect switch according to claim 25 further comprising a first substrate and a second substrate in spaced apart facing relation, wherein the plurality of input optical paths, the plurality of output optical paths, the array of movable reflectors, the plurality of row address lines, the plurality of column address lines and the first clamp electrode are on the first substrate and wherein the second clamp electrode is on the second substrate.

28. An optical cross-connect switch according to claim 24 further comprising:
a global magnetic actuator that applies a global magnetic actuation force to the array of movable reflectors that can move the reflectors from the first position toward the second position.

29. An optical cross-connect switch according to claim 25 further comprising:
a global magnetic actuator that applies a global magnetic actuation force to the array of movable reflectors that can move the reflectors from the first position toward the second position.

30. An optical cross-connect switch according to claim 28 wherein a predetermined voltage is applied to the first clamp electrode, a selected row address line and a selected column address line to thereby cause the movable mirror that corresponds to the selected row address line and the selected column address line to move from the first position toward the second position in the presence of the global magnetic field.

31. An electromechanical switch system comprising:
a plurality of inputs;
a plurality of outputs;
an array of electromechanical switches that are arranged in a plurality of rows of the electromechanical switches and a plurality of columns of the electromechanical switches and that selectively move to couple the plurality of inputs to the plurality of outputs;
a plurality of row address lines, a respective one of which is electromagnetically coupled to a respective row of the electromechanical switches;
a plurality of column address lines, a respective one of which is electromagnetically coupled to a respective column of the electromechanical switches; and
a substrate, wherein the plurality of inputs, the plurality of outputs, the array of electromechanical switches, the plurality of row address lines and the plurality of column address lines are on the substrate;
wherein each of the electromechanical switches includes an electronic switch that is electrically coupled to the respective row and column line; and wherein the electronic switch comprises a transistor having a controlling electrode and a pair of controlled electrodes, wherein the controlling electrode is electrically connected to one of the respective row and column lines and wherein one of the controlled electrodes is electrically connected to the other of the respective row and column lines.

32. An electromechanical switch system according to claim 31 wherein the electromechanical switches are configured to be selected upon selection of the respective row address line and column address line but not to be selected upon selection of neither or only one of the respective row address line and column address line.

33. An electromechanical switch system according to claim 31 wherein the electromechanical switches are configured to be selected except for an electromechanical switch that is electromagnetically coupled to the selected row address line and column address line.

34. An electromechanical switch system comprising:
a first plurality of electromechanical switches that selectively move to couple a plurality of inputs to a plurality of outputs;
a second plurality of electromagnetic control lines that are less than the first plurality and that are selectively electromagnetically coupled to the first plurality of electromechanical switches to control the selective movement thereof; and
a substrate, wherein the first plurality of electromechanical switches, the plurality of inputs, the plurality of outputs and the second plurality of electromagnetic control lines are on the substrate.

35. An electromechanical switch system according to claim 34 wherein the first plurality of electromechanical switches are arranged in a third plurality of rows and a fourth plurality of columns and wherein the second plurality is proportional to a sum of the third plurality and the fourth plurality.

36. An electromechanical switch system according to claim 34 wherein the first plurality of electromechanical switches are arranged in a third plurality of rows and a fourth plurality of columns and wherein the second plurality is equal to a sum of the third plurality and the fourth plurality.

37. A method of operating an optical cross-connect switch that includes a plurality of input optical paths, a plurality of output optical paths, an array of movable reflectors that are arranged in a plurality of rows of the movable reflectors and a plurality of columns of the movable reflectors and that selectively move between a first position that is outside the input optical paths and a second position along at least one of the input optical paths, each of the movable reflectors including a first movable electrode and a second movable electrode that are attached thereto, a plurality of row address lines, a respective one of which is electrically coupled to the first movable electrodes in a respective row of the movable reflectors, a plurality of column address lines, a respective one of which is electrically coupled to the second movable electrodes in a respective column of the movable reflectors, a first clamp electrode that is adjacent the first position of the movable reflectors, a second clamp electrode that is adjacent the second position of the movable reflectors and a global magnetic actuator that applies a global magnetic actuation force to the array of movable reflectors that can move the reflectors from the first position toward the second position, the method comprising:

applying a predetermined voltage to the first clamp electrode, a selected row address line and a selected column address line while simultaneously applying the global magnetic actuation force to the array to thereby cause the movable mirror that corresponds to the selected row address line and the selected column address line to move from the first position toward the second position.

38. A method according to claim 37 further comprising:

removing the predetermined voltage from the selected row address line and the selected column address line while simultaneously applying the global magnetic actuation force to the array to thereby clamp the movable mirror that corresponds to the selected row address line and the selected column address line to the second clamp electrode in the second position.

* * * * *